US010056965B2

(12) United States Patent
Berry

(10) Patent No.: US 10,056,965 B2
(45) Date of Patent: Aug. 21, 2018

(54) SYSTEM AND METHOD FOR MOBILE DATA EXPANSION

(71) Applicant: Neutronic Perpetual Innovations Operating, LLC, Irving, TX (US)

(72) Inventor: Terrance Berry, Irving, TX (US)

(73) Assignee: Neutronic Perpetual Innovations Operating, LLC, Irving, TX (US)

(*) Notice: Subject to any disclaimer, the term of this patent is extended or adjusted under 35 U.S.C. 154(b) by 0 days.

(21) Appl. No.: 15/620,476

(22) Filed: Jun. 12, 2017

(65) Prior Publication Data

US 2017/0290091 A1  Oct. 5, 2017

Related U.S. Application Data

(63) Continuation of application No. 15/267,013, filed on Sep. 15, 2016, now Pat. No. 9,806,792, which is a
(Continued)

(51) Int. Cl.
*H04M 1/00* (2006.01)
*H04B 1/38* (2015.01)
(Continued)

(52) U.S. Cl.
CPC .......... *H04B 7/15507* (2013.01); *E01F 9/60* (2016.02); *G01S 1/68* (2013.01); *G01S 7/003* (2013.01); *G01S 13/92* (2013.01); *G01S 19/48* (2013.01); *G06K 9/18* (2013.01); *G06K 9/2063* (2013.01); *G06K 9/78* (2013.01); *H04B 1/3888* (2013.01); *H04L 67/12* (2013.01); *H04W 4/025* (2013.01); *H04W 4/027* (2013.01); *H04W 4/028* (2013.01); *H04W 4/029* (2018.02); *H04W 4/046* (2013.01); *H04W 16/26* (2013.01); *H04W 36/14* (2013.01);
(Continued)

(58) Field of Classification Search
CPC .......................... H04B 1/3888; H04B 7/15507
USPC .................................................. 455/73, 561
See application file for complete search history.

(56) References Cited

U.S. PATENT DOCUMENTS 9,171,459 B2   10/2015   Yorke et al.
2011/0296051 A1*   12/2011   Vange ............... H04L 41/12
709/238
(Continued)

*Primary Examiner* — Ayodeji Ayotunde

(57) ABSTRACT

A data expansion system that provides for wireless communication includes a set of roadway communication devices configured to enable vehicle-to-vehicle (V2V) communication. The system includes a first roadway communication device configured to receive data from a first electronic device in a first vehicle and a second roadway communication device communicatively coupled to the first roadway device. The second roadway communication device is configured to communicate the data to a second electronic device in a second vehicle. Each roadway communication device includes a wireless transceiver to transmit and receive data; a communication interface to establish communication links with other roadway communication devices; and processing circuitry to relay the data between the other roadway communication devices or electronic devices in respective vehicles. Each roadway communication device also includes a housing that contains the processing circuitry, communication interface and the wireless transceiver. The housing is configured to be mounted within a roadway surface.

20 Claims, 16 Drawing Sheets

Related U.S. Application Data continuation-in-part of application No. 14/876,673, filed on Oct. 6, 2015, now Pat. No. 9,596,611, which is a continuation of application No. 13/840,578, filed on Mar. 15, 2013, now Pat. No. 9,219,991, which is a continuation-in-part of application No. 13/646,537, filed on Oct. 5, 2012, now Pat. No. 8,447,239.

(60) Provisional application No. 61/668,867, filed on Jul. 6, 2012.

(51) Int. Cl.

| | | |
|---|---|---|
| *H04B 7/155* | (2006.01) | |
| *E01F 9/60* | (2016.01) | |
| *H04W 88/08* | (2009.01) | |
| *H04W 4/029* | (2018.01) | |
| *H04W 76/10* | (2018.01) | |
| *G01S 19/48* | (2010.01) | |
| *G01S 1/68* | (2006.01) | |
| *G01S 7/00* | (2006.01) | |
| *G01S 13/92* | (2006.01) | |
| *G06K 9/18* | (2006.01) | |
| *G06K 9/20* | (2006.01) | |
| *G06K 9/78* | (2006.01) | |
| *H04B 1/3888* | (2015.01) | |
| *H04W 4/02* | (2018.01) | |
| *H04W 4/04* | (2009.01) | |
| *H04W 16/26* | (2009.01) | |
| *H04W 36/14* | (2009.01) | |
| *H04W 36/32* | (2009.01) | |
| *H04W 76/02* | (2009.01) | |
| *H04L 29/08* | (2006.01) | |
| *H04W 84/12* | (2009.01) | |
| *H04W 88/04* | (2009.01) | |
| *G01S 19/10* | (2010.01) | |
| *H02J 7/35* | (2006.01) | |
| *H04W 36/08* | (2009.01) | |
| *G06K 9/32* | (2006.01) | |

(52) U.S. Cl.
CPC ........... *H04W 36/32* (2013.01); *H04W 76/02* (2013.01); *H04W 76/10* (2018.02); *H04W 88/08* (2013.01); *G01S 19/10* (2013.01); *G06K 9/325* (2013.01); *G06K 2209/15* (2013.01); *H02J 7/35* (2013.01); *H04W 36/08* (2013.01); *H04W 84/12* (2013.01); *H04W 88/04* (2013.01)

(56) References Cited

U.S. PATENT DOCUMENTS

2013/0113618 A1* 5/2013 Flanagan ............... G08G 1/166
340/539.1
2013/0275032 A1* 10/2013 Yorke ..................... G08G 1/00
701/119
2014/0253345 A1* 9/2014 Breed ............. G08G 1/096716
340/905

* cited by examiner

SYSTEM AND METHOD FOR MOBILE DATA EXPANSION

CROSS-REFERENCE TO RELATED APPLICATIONS AND CLAIMS OF PRIORITY

This application is a continuation of U.S. Non-Provisional patent application Ser. No. 15/267,013 entitled "SYSTEM AND METHOD FOR MOBILE DATA EXPANSION" and filed Sep. 15, 2016, which is a continuation-in-part of U.S. Non-Provisional patent application Ser. No. 14/876,673 entitled "SYSTEM AND METHOD FOR MOBILE DATA EXPANSION" and filed Oct. 6, 2015, now U.S. Pat. No. 9,596,611, which is a continuation of U.S. Non-Provisional patent application Ser. No. 13/840,578 entitled "SYSTEM AND METHOD FOR MOBILE DATA EXPANSION" and filed Mar. 15, 2013, now U.S. Pat. No. 9,219,991, which is a continuation-in-part of U.S. Non-Provisional patent application Ser. No. 13/646,537 entitled "SYSTEM AND METHOD FOR MOBILE DATA EXPANSION" and filed on Oct. 5, 2012, now U.S. Pat. No. 8,447,239, and claims priority through those applications to U.S. Provisional Patent Application No. 61/668,867 entitled "SYSTEM AND METHOD FOR MOBILE DATA EXPANSION" and filed on Jul. 6, 2012. The content of the above-identified patent documents is incorporated herein by reference.

TECHNICAL FIELD

The present application relates generally to mobile broadband data services, and more specifically to discrete WiFi hotspots for mobile devices.

BACKGROUND

Wireless data communications are increasing in demand and popularity. Mobile devices use cellular data networks or small wireless fidelity (WiFi) networks (WiFi hotspots) to access broadband data services for mobile devices. While cellular data networks provide a wider coverage, WiFi hotspots are capable of higher data transfer rates and lower power usage at a lower cost. However, WiFi hotspots provide a limited coverage area inhibiting use when the user is moving between locations.

SUMMARY

A system is provided. The system includes a first roadway communication device configured to receive data from a first electronic device in a first vehicle. The system also includes a second roadway communication device communicatively coupled to the first roadway device and configured to communicate the data to a second electronic device in a second vehicle. Each of the roadway communication devices includes a wireless transceiver configured to transmit and receive data; a communication interface configured to establish communication links to and from at least one other roadway communication device; and processing circuitry configured to relay the data between one or more of: other roadway communication devices or electronic devices in respective vehicles. Each of the roadway communication devices also includes a housing configured to contain the processing circuitry, communication interface and the wireless transceiver, wherein the housing is configured to be mounted within a roadway surface.

A method is provided. The method includes receiving, by a first roadway communication device, data from a first electronic device in a first vehicle. The method also includes relaying, by the first roadway communication device, the data to a second roadway communication device. The method further includes communicating, by the second roadway communication device, the data to a second electronic device in a second vehicle. Each of the roadway communication devices includes a housing configured to be mounted on or within a roadway surface.

A roadway device is provided. The roadway device includes a transceiver configured to transmit and receive data from a first electronic device in a first vehicle. The roadway device also includes a communication interface configured to communicatively couple to at least one other roadway communication device and processing circuitry configured to relay the data between the electronic device and the at least one other roadway communication device. The roadway device further includes a housing configured to contain the processing circuitry, communication interface and the wireless transceiver.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller might be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Figure 1A:
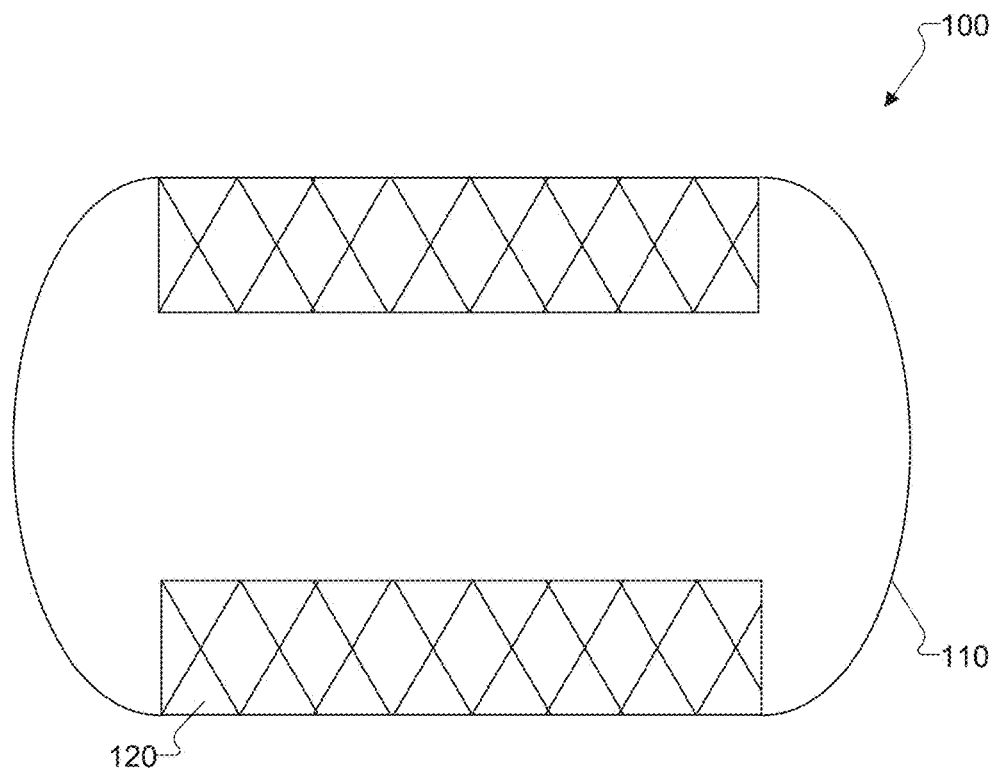
FIGS. 1A and 1B illustrate a small cell data expansion reflector (DER) according to embodiments of the present disclosure.
Figure 1B:
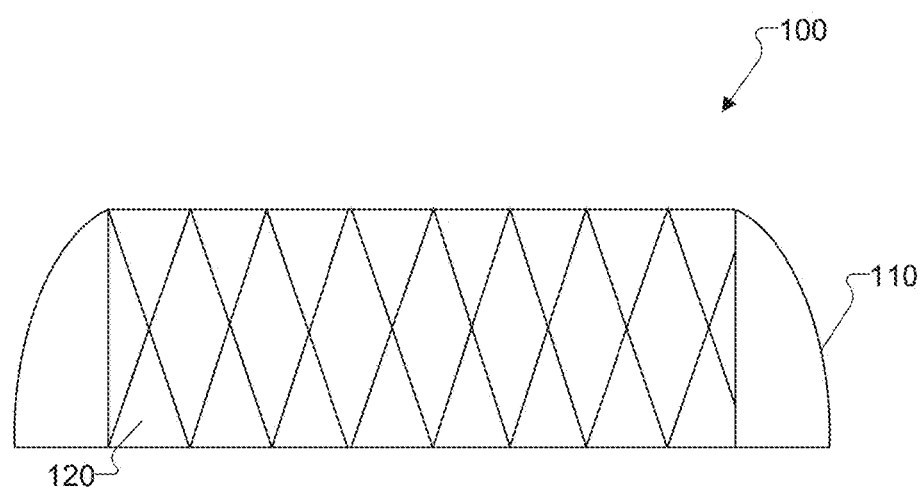

FIGS. 1A and 1B illustrate a small cell data expansion roadway device (DER) according to embodiments of the present disclosure. Although certain details will be provided with reference to the components of the DER, it should be understood that other embodiments may include more, less, or different components.

The DER 100 is a small cell device configured to provide a wireless communication link between a mobile device and a backhaul network. The DER 100 is adapted to couple to one or more mobile devices to enable the mobile devices to send and receive information, such as data and control signals, to the backhaul network. As such, the DER 100 is configured to provide one or more of: a wireless coverage area; a cellular coverage area; a hotspot, such as a WiFi hotspot; and the like.

The DER 100 can be configured as a street surface reflector (also called a surface marker, lane divider, road marker, and the like), such as a road reflector, raised pavement marker, street reflector, road stud, pavement reflector, and roadway marker used for traffic control and safety. In the example shown in FIGS. 1A and 1B, the DER 100 is configured as a roadway marker with a cylindrical housing configured to disposed in or on a roadway or pedestrian pathway. In certain embodiments, the DER 100 with a cylindrical housing is disposed in the road surface such that a highest portion of the housing is substantially flush (i.e., within one centimeter) with the road surface.

In certain embodiments, the DER 100 includes one or more surfaces that are comprised of a reflective material 120. For example, the DER housing 110 includes a mounting surface, a top surface, and a plurality of side surfaces. In certain embodiments, the surfaces of the reflective material include the plurality of side surfaces, the top surface, or a combination thereof. The DER 100 is made up of one or more of the reflective material, plastic, a ceramic, or other suitable materials. In certain embodiments, only selected ones of the plurality of side surfaces and the top surface include the reflective material. That is, the portions of the DER 100 that are made of the reflective material are less than a whole portion. For example, in the example shown in FIGS. 1A and 1B, two rectangular sides of the DER 100 include the reflective material. In certain embodiments, the DER 100 housing can be in any of a variety of shapes, such as circular, oval, rectangular, octagonal, hexagonal, trapezoidal, or any suitable shape.

Figure 2A:
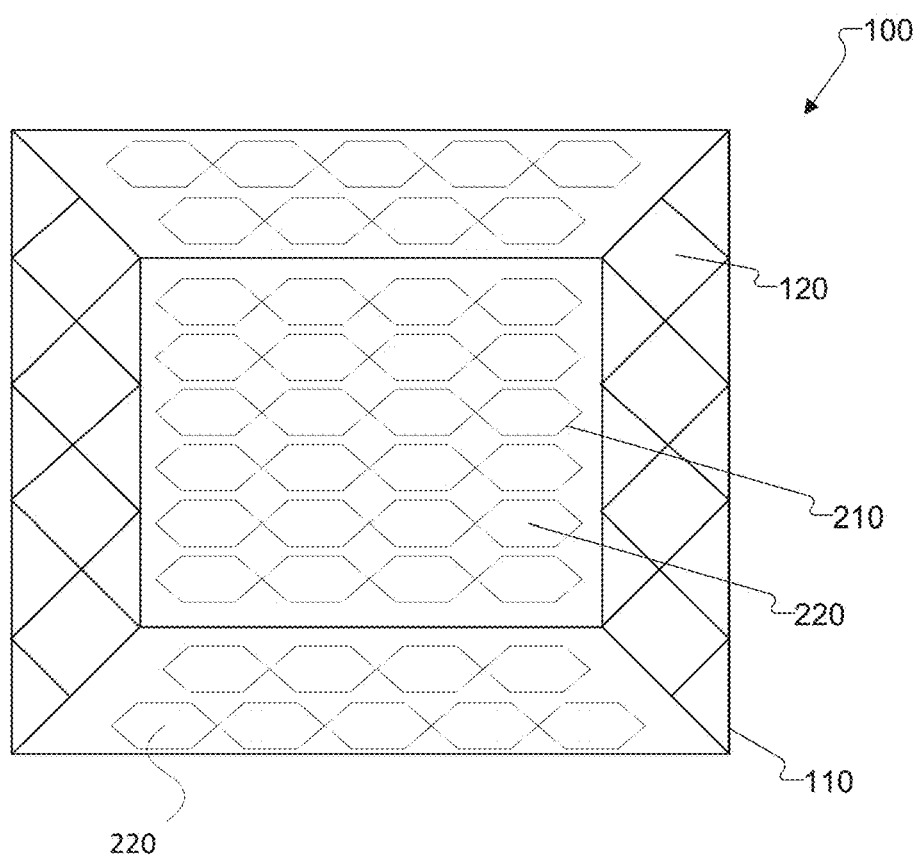
FIGS. 2A, 2B and 2C illustrate a data expansion device that includes a solar array panel according to embodiments of the present disclosure.
Figure 2B:
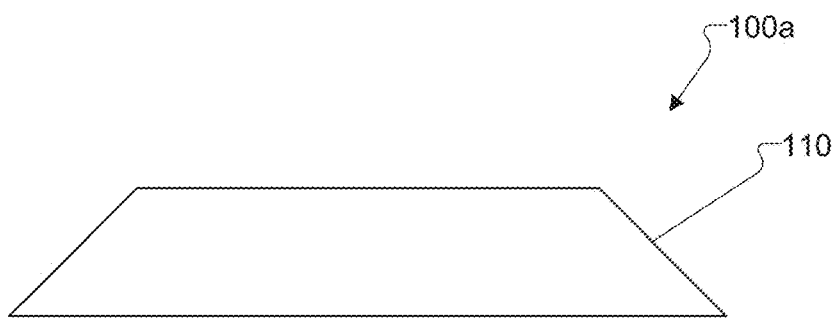
Figure 2C:
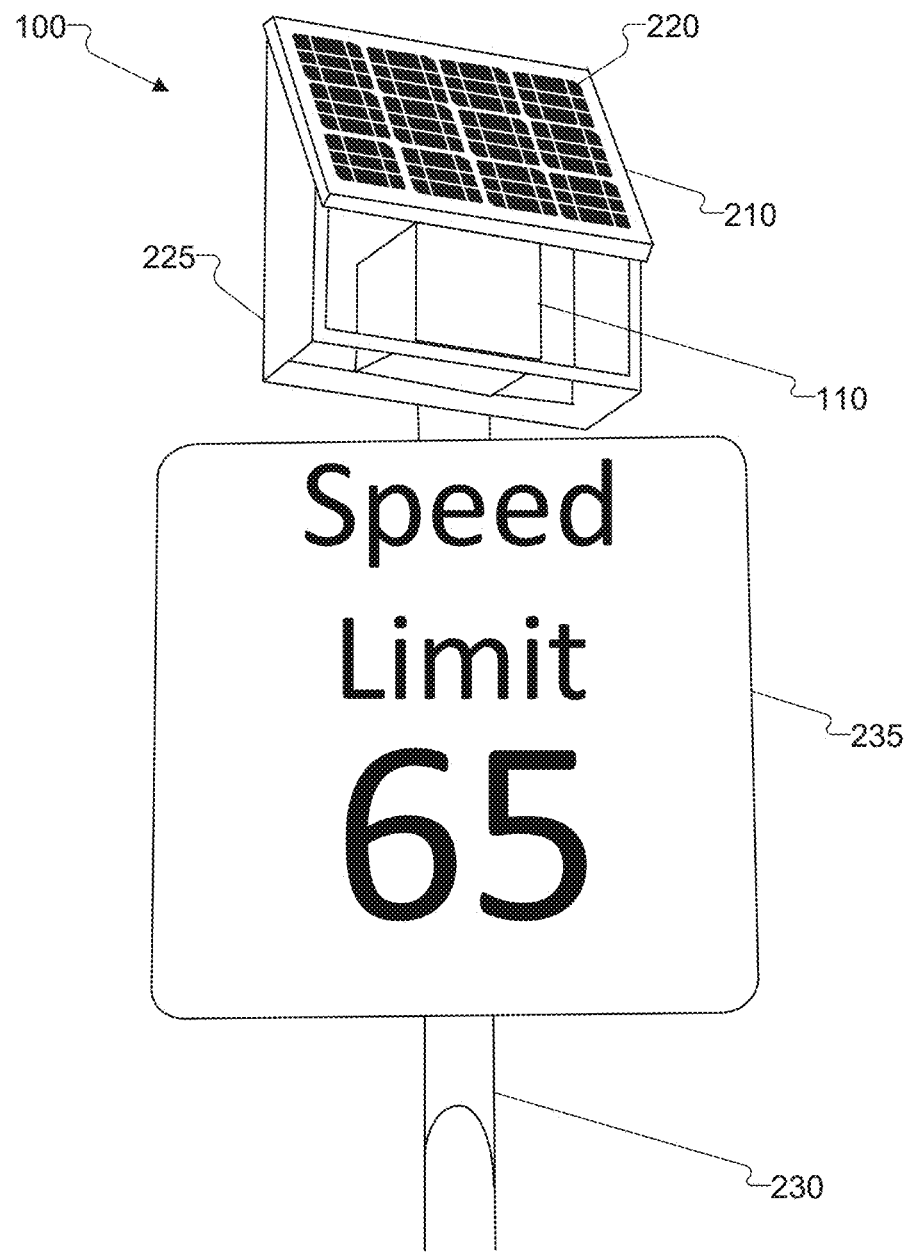

FIGS. 2A, 2B and 2C illustrate a data expansion device that includes a solar array panel according to embodiments of the present disclosure. Although certain details will be provided with reference to the components of the data expansion device, it should be understood that other embodiments may include more, less, or different components. The data expansion device shown in FIGS. 2A, 2B and 2C is configured as a data expansion roadway device (DER) 100.

In the example shown in FIGS. 2A and 2B, the DER 100 is configured as a roadway reflector. In the example shown in FIG. 2C, the DER 100 is included with, or configured as, a roadway marker, such as a street sign or traffic control device.

In certain embodiments, the DER 100 includes a self-sustaining power source or power supply. In certain embodiments, at least one surface, such as the top surface, includes a solar panel 210 that as the self-sustaining power source. The self-sustaining power source configured as a solar panel 210 includes a number of solar cells 220, such as a solar cell array, that include a plurality of photo-voltaic cells to form at least one solar panel 210. Although one solar panel 210 is depicted, embodiments including more than one solar panel 210 could be used without departing from the scope of the present disclosure. In certain embodiments, the DER 100 includes a power interface configured to couple to a self-sustaining power source, such as a solar cell 220. In certain embodiments, the power interface is configured to removably couple to the self-sustaining power source.

In certain embodiments, the DER 100 includes a housing 110 that is a truncated pyramid shape. The solar panel 210 can be disposed atop the housing 110 or coupled to the housing 110. One or more sides of the housing can include the solar cells 220. Reflective material 120 is disposed on one or more remaining sides of the housing 110. The sides of the housing 110 that include the solar cells 220 can be oriented to correspond to the sides that allow the greatest amount of solar energy to be absorbed throughout a day and a year. In certain embodiments, the housing includes a clear protective cover disposed over or around the solar array panel 210. The clear protective cover is comprised of any suitable clear material such as a PLEXIGLAS material or other hard plastic, glass or composite material. In certain embodiments, the clear material is comprised of a reflective material and configured as a portion of the reflective surfaces. In certain embodiments, the solar array panel 210 is embedded into the reflective surface or disposed beneath the clear material as a reflective surface.

In the example shown in FIG. 2C, the DER 100 includes, or is coupled to, a vertical mount. For example, the housing 110 can include a mounting interface 225 configured to couple to a vertical structure 230. The DER 100 or vertical structure 230 can include a traffic control device, such as a street sign 235. The housing 110 contains operating components of the DER, such as one or more of: processing circuitry, wifi transceivers, antennas, processors, interfaces and power couplings.

The DER 100 can be oriented to maximize solar energy captured by the solar cells 220 or oriented to provide maximum wireless communication coverage over a road surface or over a pedestrian surface. As with other embodiments of the present disclosure, the DER 100 depicted in FIG. 2C is configured to provide wireless coverage, such as a wifi signal or wifi hotspot zone, to the road or pedestrian surface and couple directly to the backhaul network or couple to the backhaul network through an access point, thus bypassing a base station or enhanced Node B (eNodeB or eNB) and such that the data is not communicated through the base station or eNodeB.

Figure 3A:
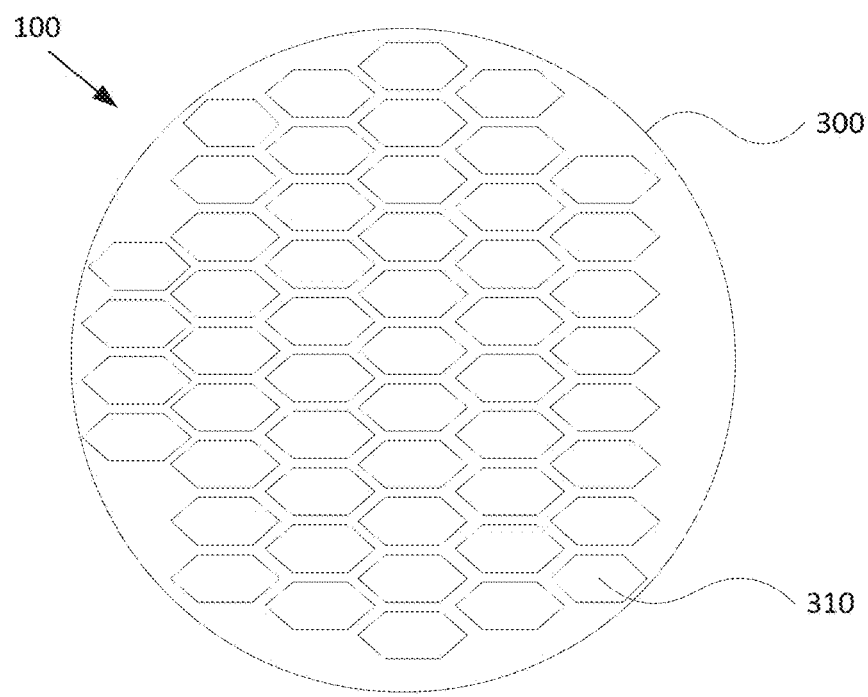
FIGS. 3A and 3B illustrate a DER with a cylindrical housing according to embodiments of the present disclosure.
Figure 3B:
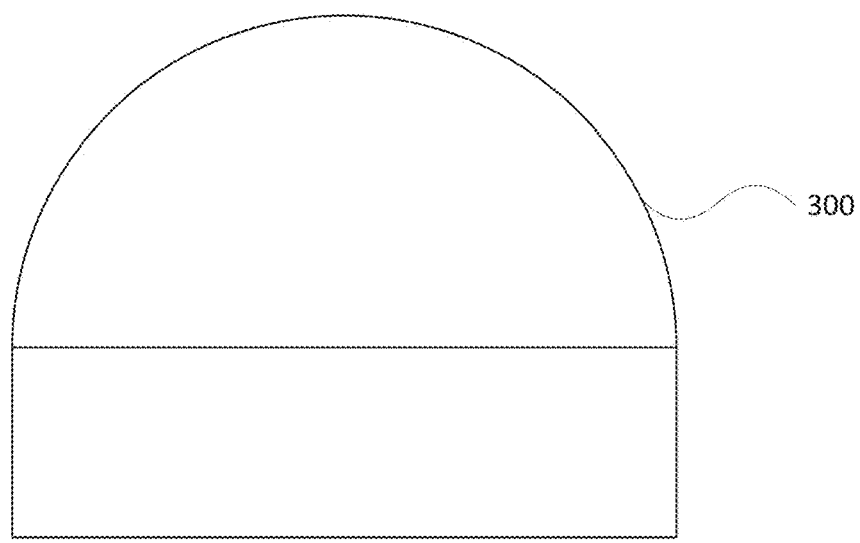

FIGS. 3A and 3B illustrate a DER 100 with a cylindrical housing 300 according to embodiments of the present disclosure. Although certain details will be provided with reference to the components of the DER 100, it should be understood that other embodiments may include more, less, or different components.

The DER 100 with a cylindrical housing 300 that has at least one reflective surface. In certain embodiments, the DER 100 with a cylindrical housing 300 includes a solar array panel 310 disposed atop the reflective surface or disposed beneath a clear reflective surface. The housing 300 can be a truncated sphere atop a cylinder shape. In certain embodiments, the solar array panel 310 is embedded or cut into the reflective surface. In certain embodiments, the DER 100 with a cylindrical housing 300 is disposed in the road surface such that a highest portion of the housing 300 is substantially flush (i.e., within one centimeter) with the road surface.

In certain embodiments, a portion of the DER 100 with a cylindrical housing 300 includes a reflective surface. In certain embodiments, a portion of the DER 100 with a cylindrical housing 300 includes a solar cell array 310. In certain embodiments, a portion of the DER 100 with a cylindrical housing 300 includes a reflective material and a separate portion of the reflector 100 includes a reflective surface. In certain embodiments, the DER 100 with a cylindrical housing 300 includes a solar array 310 that is also a reflective surface.

Figure 3C:
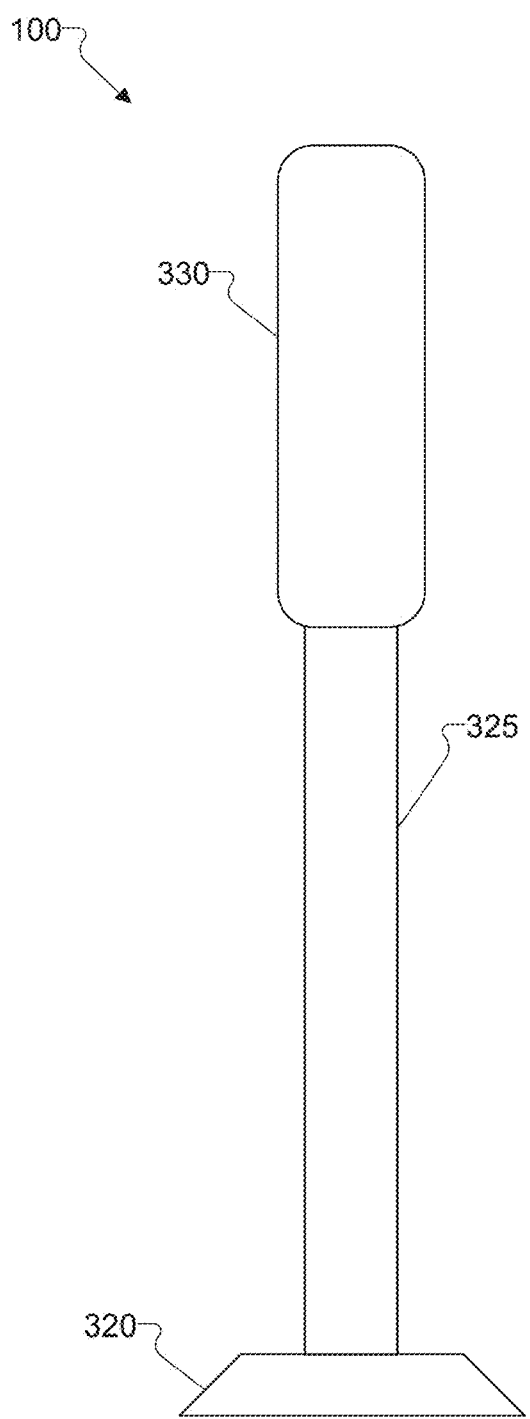
FIG. 3C illustrates a data expansion device configured as a roadway marker according to embodiments of the present disclosure.

FIG. 3C illustrates a data expansion device configured as a roadway marker according to embodiments of the present disclosure. The DER 100 shown in FIG. 3C is for illustration only. In the example shown in FIG. 3C, the DER 100 is included with, or configured as, a roadway marker, such as a mile marker, roadway indicator and or traffic control device.

In the example shown in FIG. 3C, the DER 100 includes a base 320 and a delineator post 325. In certain embodiments, the DER 100 includes a plate 330, such as a reflector, mile marker, or other delineator plate.

The base 320 is configured to include processing circuitry for the DER 100. The base 320 includes a housing that encloses the processing circuitry for the DER 100. For example, the base 320 can include one or more processors, a transceiver, such as a wifi transceiver and other suitable circuitry for forming a data hotspot, such as a wifi hotspot. The base 320 is adapted to be mounted on, or adhered to, a roadway or pedestrian surface. In certain embodiments, some or all of the base 320 is disposed beneath a surface of the roadway or pedestrian surface.

The delineator post 325 can be rigid or flexible. The delineator post 325 can be formed from steel, aluminum, plastic, carbon fiber, or any suitable material. In certain embodiments, the delineator post 325 includes one or more components configured to operate as an antenna. In certain embodiments, the delineator post 325 includes one or more antennas. In certain embodiments, the delineator post 325 is configured to operate as an antenna. In certain embodiments, the delineator post 325 and plate 330 are configured to operate as an antenna.

The plate 330 can be rigid or flexible. In certain embodiments, the plate 330 includes a reflective material. In certain embodiments, the plate 330 includes traffic, roadway, or safety information. The plate 330 can be formed from steel, aluminum, plastic, carbon fiber, or any suitable material. The plate 330 is affixed to the delineator post 325 through any suitable means such as, bolts, screw, adhesives, interlocking fasteners, hook and loop connections, hooks, and the like. In certain embodiments, the plate 330 includes, or is comprised of, solar cells, such as photovoltaic cells. In certain embodiments, the plate 330 includes one or more solar panels comprised of a plurality of solar cells.

Figure 4:
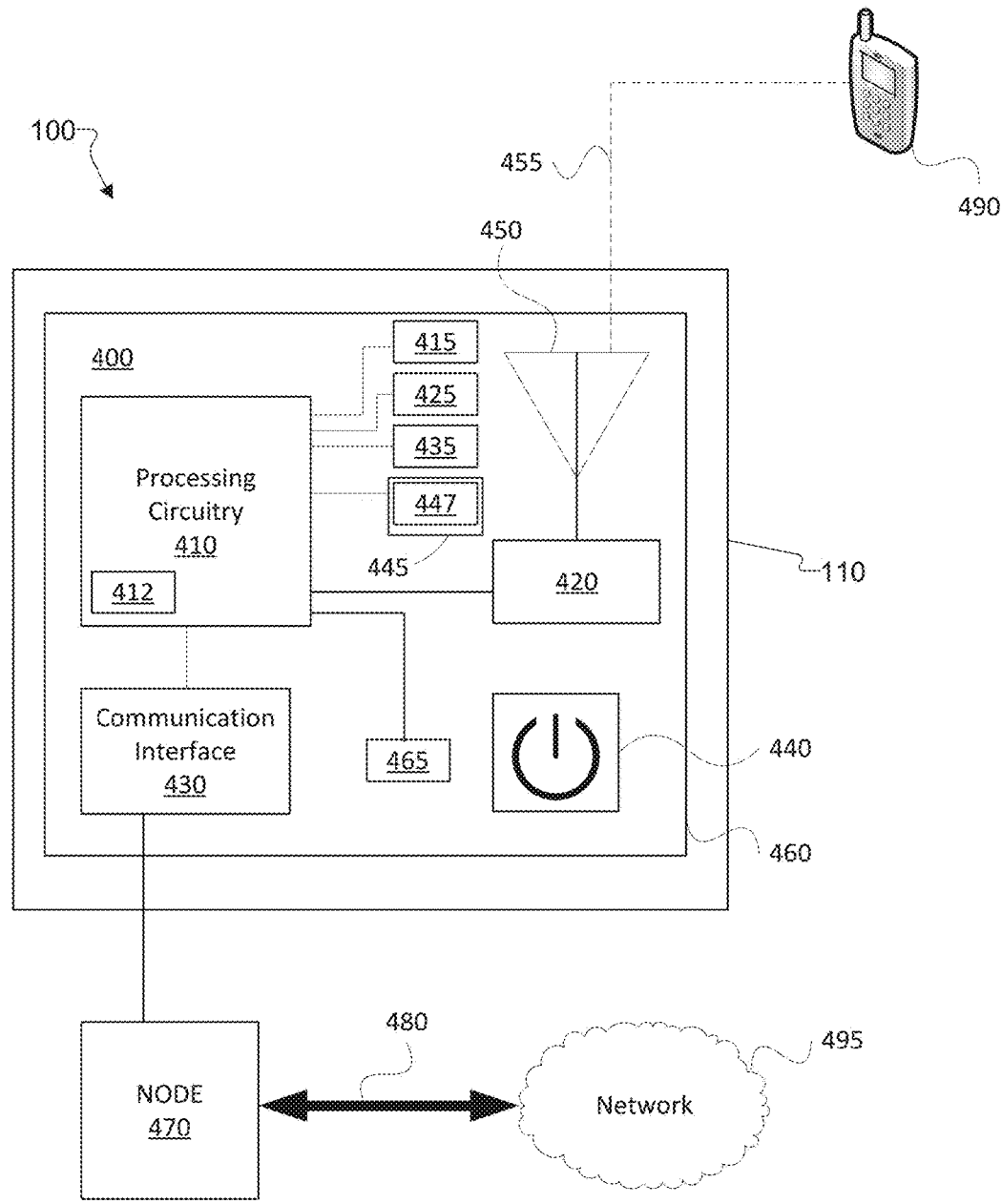
FIG. 4 illustrates selected electrical and electronic components of a control system inside a DER according to embodiments of the present disclosure.

FIG. 4 illustrates components of a control system 400 inside a DER 100 according to embodiments of the present disclosure. Although certain details will be provided with reference to the components of the control system 400, it should be understood that other embodiments may include more, less, or different components. The components of the control system 400 can be included in the embodiments of the DER 100 shown in any of FIGS. 1A, 1B, 2A, 2B, 2C, 3A, 3B and 3C or in any suitable structure configured to as a roadway marker, pedestrian marker, traffic control device configured to be disposed in, on or under a road or pedestrian traffic surface, and the like.

The DER 100 includes the control system 400. The control system 400 is configured to enable the DER 100 to provide access to broadband data services for mobile terminals. The control system 400 includes processing circuitry 410, a transceiver 420, a communication interface 430, a power source 440, and an antenna 450. In certain embodiments, the control system 400 includes one or more of the following: a Radio Detection And Ranging (RADAR) unit 415, a camera 425, a global positioning system (GPS) receiver 435, and a climate control unit 445. The housing 460 is configured to contain the control system 400. In certain embodiments, the housing 460 is the same as housing 110 of the DER 100. In certain embodiments, the control system 400 also includes a network node 470. The network node 470 operates as an access point, providing features such as access control, theft prevention, data traffic monitoring, data traffic shaping, network node to network node signaling, and various other features associated with network access and control. The network node 470, as an access point, provides controlled access to the backhaul network, such as controlled access to an internet network.

The processing circuitry 410 is coupled to the RADAR unit 415, the transceiver 420, the camera 425, the communication interface 430, the GPS receiver 435, the power source 440, and the climate control unit 445. The processing circuitry 410 is configured to establish a communication with at least one mobile terminal 490 through a coupling with the transceiver 420. The processing circuitry 410, communicably coupled to the mobile terminal 490, enables communications between the mobile terminal 490 and a backhaul network 495 of computers, such as the Internet (namely, a world-wide-web; a world-wide-network) or a private network. The processing circuitry 410 forms one or more communication channels to communicate information between the mobile terminal 490 and the network 495. The control system 400 establishes a secure channel for sending and receiving control and data signals to and from one or more mobile terminal 490. The processing circuitry 410 provides a virtual private network (VPN) initialization and termination for communications between the control system 400 and the mobile terminal 490. That is, the DER 100 can communicate with the mobile terminal 490 via a secured channel using a VPN. In certain embodiments, the processing circuitry 410 is configured to send encrypted data and to decipher encrypted data received from the mobile terminal 490. That is, the processing circuitry 410 and mobile terminal 490 establish an encryption agreement or share a common encryption key used to secure the data transmitted between the mobile terminal 490 and the DER 100.

In certain embodiments, the processing circuitry 410 includes a programmable controller. The programmable controller is configured to be reprogrammable to control one or more functions of the processing circuitry, at a later date. In certain embodiments, the programmable controller is configured, such as pre-configured, to control one or more functions of the processing circuitry 410. In certain embodiments, the processing circuitry 410 is embodied as a programmable controller. In the present disclosure, any description of a function or coupling of the processing circuitry 410 is understood to be a function or coupling of the programmable controller.

In certain embodiments, the processing circuitry 410 includes a memory 412. In certain embodiments, the processing circuitry 410 is coupled to the memory 412, such as the example shown in FIG. 9. The memory 412 includes any suitable volatile or non-volatile storage and retrieval device(s). For example, the memory 412 can include any electronic, magnetic, electromagnetic, optical, electro-optical, electro-mechanical, or other physical device that can contain, store, communicate, propagate, or transmit information. The memory 412 stores data and instructions for use by the processor or programmable controller of the processing circuitry 410. In certain embodiments, the memory 412 stores location information. For example, the memory 412 is programmed to store a location of the DER 100, such as a global positioning system (GPS) location or a location provide by the network. For example, the network or and operator can program the DER 100 with a geographic location at the time of installation of the DER 100. In certain embodiments, in response to receiving a signal indicating the location of the DER 100, the processing circuitry 410 stores the location in the memory 412.

The control system 400 includes the RADAR unit 415 configured to perform a RADAR gun function. The RADAR unit 415 is configured to transmit RADAR waves toward one or more objects and to receive return reflected waves. That is, the RADAR unit 415 includes a radio signal transmitter configured to transmit radio waves outward from the DER 100. When incident upon an object (for example, a vehicle, the radio waves reflect off the object and return to the control system of the DER 100. The RADAR unit 415 includes a radio signal receiver configured to receive the return reflected waves. The RADAR unit 415 transmits waveform information corresponding to the transmitted and reflected waves to the processing circuitry 410. The RADAR unit 415 and processing circuitry 410 use the RADAR wave information to determine the speed and direction of travel of the vehicle (together, the vehicle velocity). The RADAR unit 415 and processing circuitry 410 use the RADAR wave information to determine a proximal distance from the RADAR unit to the vehicle. The RADAR unit 415 within the DER 100 can be used to monitor the flow of traffic on streets and highways.

For example, the roadway speed limit corresponding to the location of the DER 100 is stored in the memory 412. As vehicles, drive by the DER 100, the RADAR unit 415 measures the speed and direction of the traffic. The processing circuitry 410 compares the speed of one or more vehicles to the stored speed limit. The control system 400 sends the vehicle speed information and the speed comparison to a network 495 computer or network user, such as a traffic law enforcement system, a government department of transportation traffic controller or a roadway traffic monitoring service system. The information can include an estimated amount of time travel between certain mile markers, or an estimated time of arrival at a highway junction or exit ramp.

The control system 400 includes a transceiver 420. The transceiver 420 is configured to transmit data and to receive data. In certain embodiments, the transceiver 420 is a wireless transceiver, for example a WiFi transceiver. In certain embodiments, the transceiver 420 includes an antenna 450. The antenna 450 is configured to enable the transceiver 420 to send data to mobile terminal 490 and to receive data from the mobile terminal 490. In certain embodiments, when mounted on a vertical mount, such as the street sign shown in FIG. 2C, portions of the antenna are included in a portion of the vertical structure 230, such as on the traffic control device. For example, a portion of the street sign 235 can be configured to operate as antenna 450 or to operate a part of antenna 450. In certain embodiments, when configured as a roadway marker, such as the roadway marker shown in FIG. 3C, portions of the antenna are included in a portion of the delineator post 325. For example, all or a portion of delineator post 325 or plate 33o can be configured to operate as antenna 450 or to operate a part of antenna 450. Alternatively, one or more antennas can be included in the delineator post 325 or plate 330.

In certain embodiments, the transceiver 420 is coupled to antenna 450, enabling the transceiver 420 to send data to a mobile terminal 490 and to receive data from the mobile terminal 490. The transceiver 420 communicates data between the processing circuitry 410 and the mobile terminal 490. That is, the transceiver 420 receives data from the processing circuitry 410 and transmits the data received from the processing circuitry 410 to the mobile terminal 490. The transceiver 420 also receives data from the mobile terminal 490 and transmits the data received from the mobile terminal 490 to the processing circuitry 410. The processing circuitry 410 is communicably coupled to the network node 470. The processing circuitry 410 sends signals to the node 470 and receives signals from the node 470. For example, in response to a signal sent from the processing circuitry 410 to the node 470, the processing circuitry 410 receives one or more signals from the node 470. The processing circuitry 410 sends communications to a network 495 of computers (also referred to as the Internet) and receives communications from the network 495 via the node 470. When the processing circuitry 410 is communicably coupled to the network 495, the processing circuitry 410 is configured to enable the mobile terminal 490 to communicate with the network 495 via the transceiver 420 and the node 470.

The control system 400 includes a communication interface 430. The communication interface 430 enables communications with one or more of: the processing circuitry 410, a node 470, the backhaul network 480, one or a plurality of mobile terminals 490, and the network 495. Communications can be through a wireless data transfer communication, a wireless local area network (WLAN) Internet communication, an optic communication medium, infrared communication medium, or through wireless-fidelity (WiFi) communication.

The control system 400 includes a camera 425. The camera is configured to capture images of the environment surrounding the DER 100. The camera 425 is configured to capture images of vehicle that is approaching or departing from the DER 100, including images of the vehicle license plates. For example, the processing circuitry can instruct the camera 425 to capture images of a vehicle driving faster than the speed limit or driving slower than the highway minimum speed.

For example, the processing circuitry 410 receives a targeted license plate number. The mobile phone 490 can forward an AMBER alert to the control system 400 via the link 455, including a corresponding targeted license plate number. The processing circuitry stores the targeted license plate number in the memory 412. The control system 400 is configured to perform image processing, including optical character recognition (OCR). That is, the camera 425 or the processing circuitry 410 performs an OCR on the images of vehicle license plates captured by the camera 425. The processing circuitry 410 is configured to compare the license plate numbers recognized in the images to the targeted license plate numbers stored in memory 412. When the recognized license plate number matches one or more targeted license plates numbers, the processing circuitry 410 sends the location of the DER 100, the matching license plate information, and the corresponding image to a user in the network 495. The network 495 user may be a law enforcement officer within close proximity to the DER 100.

The control system 400 includes a GPS receiver 435 configured to receive a signal indicating the GPS location of the DER 100. The control system 400 is configured to store the received GPS location in the memory 412 as the location of the DER 100.

In certain embodiments, the processing circuitry 410 is configured to communicate with one or more traffic control or safety devices, or both. For example, the processing circuitry 410 can send control signals, including activation signals, deactivation signals, or both, to one or more streetlights in an area or section of the roadway, send control signals, including activation signals, deactivation signals, or both, to a traffic signal or traffic control device. In certain embodiments, the control system 400 includes one or more sensors 465 configured to operate in conjunction with the processing circuitry 410 to send control signals to one or more traffic control or safety devices, or both. The one or more sensors 465 can be configured to detect one or more of: vehicles, radio frequency identifier (RFID) chips, or mobile devices. In response to detecting one or more of vehicles, radio frequency identifier (RFID) chips, or mobile devices by the one or more sensor 465, the processing circuitry 410 communicates, via transceiver 420, communication interface 430 or another communication interface, signals to the one or more traffic control or safety devices.

The power source 440 is configured to provide power to the control system 400. The power source 440 is coupled to each electrical component of the control system 400. The power source 440 can be directly coupled to each electrical component of the control system 400. In certain embodiments, the power source is directly coupled to the processing circuitry 410, enabling each electrical component coupled to the processing circuitry 410 to indirectly receive power from the power source 440. The power source 440 can be a renewable energy source, such as solar energy, wind energy, geothermal energy, biomass energy, or any combination thereof. For example, the power source 440 can include a connection with a local utility company's distribution system, or an off-the-grid island distribution system, or a combination thereof. In certain embodiments, the power source 440 is a solar array panel 210, 310. In certain embodiments, the power source 440 is a photovoltaic source embodied as photovoltaic paint or another suitable material configured to convert solar energy into electrical energy. In particular embodiments, the power source 440 includes a port or power interface adapted to couple an external power source, which is outside the DER 100 and provides power to the control system 400. In certain embodiments, the port or power interface is configured to removably couple to the external power source. In certain embodiments, the power source 440 includes one or more of the following: a solar-charging battery; a vibration-powered energy harvester configured to capture and store energy derived from ambient vibrations; a wireless power transmission receiver configured to couple to a wireless power transmitter; a conductor transmitting electricity generated from solar energy, geothermal energy, or heat; a number of solar cells; a number of solar cells disposed beneath a clear (e.g., PLEXIGLASS) cover of the housing; and a painted stripe on the road or pedestrian walk-way surface. In certain embodiments, a portion of the painted stripe is disposed within or beneath the housing 460. The vibration-powered energy harvester captures energy from ambient road vibrations or vibrations from wind against the housing 460 and converts the energy into electricity for the control system 400.

The control system 400 includes a climate control unit 445. The climate control unit 445 includes one or more sensors configured to measure temperature and moisture levels internal and external to the housing 460. The climate control unit 445 includes a heating element 447 configured to increase the temperature of the DER. In certain embodiments, the heating element 447 is disposed within the material of the housing 460. In certain embodiments, the heating element 447 is disposed on top of the housing and heats the external surface of the DER 100. In certain embodiments, the heating element 447 is disposed around a perimeter of the housing 460. As an example, when the climate control unit 445 measures an external temperature of below freezing and senses snow or ice disposed on the surface of the DER 100, then the climate control sensor turns on the heating element to increase the temperature of the DER 100 and to melt away the ice or snow. By melting away snow and ice, driverless vehicles can detect the lane markers of the roadway and control the vehicle to remain within the lane.

The antenna 450 is configured to communicably couple to the mobile terminal 490. The antenna 450 can be configured to communicate with the mobile terminal 490 using a suitable wireless communication, such as a WiFi (namely, IEEE 802.11x) communication, a near field communication (NFC), a BLUETOOTH low energy (BLE) communication, a general packet radio service (GPRS) for global system for mobile communications (GSM), an Enhanced Data rages for GSM Evolution (EDGE) communication, a third generation (3G) Universal Mobile Telecommunications System (UMTS) communication, 3G High Speed Packet Access (HSPA) communication, a 3G High Speed Downlink Packet Access (HSDPA) communication, a Worldwide Interoperability for Microwave Access (WiMax) communication, a fourth generation (4G) Long Term Evolution (LTE) communication, or any other suitable wireless communications protocol. In certain embodiments, the antenna 450 is included in the transceiver 420. In certain embodiments, the antenna 450 is coupled to the transceiver 420. The antenna 450 can be configured with omni-directional characteristics, or uni-directional characteristics. Additionally, the antenna 450 can be a directional antenna configured to communicate data in particular directions.

In certain embodiments, the control system 400 is included in housing 460. The housing 460 can be embodied as a raised reflective surface or a base of a roadway marker. Some examples of raised reflective surfaces include: a road reflector, raised pavement marker, street reflector, road stud, and pavement reflector, used for traffic control and safety. The housing 460 can be rectangular, cylindrical, oval, trapezoidal or any suitable shape. In certain embodiments, the housing 460 is dimensioned not to exceed (e.g., be equal in size or smaller than) four inches by four inches wide and two and a quarter inches high (4"×4"×2.25"). For example, when in a truncated sphere configuration, the housing 460 can be dimensioned to include a four inch (4") diameter and a height of two and a quarter inches (2.25"). The housing 460 is configured to contain the transceiver 420 and the processing circuitry 410. In certain embodiments, the housing 460 is configured to contain at least a portion of the power source 440. In certain embodiments, the housing 460 is configured to contain the entire control system 440.

In certain embodiments, the network node 470 is communicably coupled to a backhaul network 480 (for example, a private or 3$^{rd}$ Party telecommunication network). The network node 470 sends signals to and receives signals from the backhaul network 480. Through the backhaul network, the network node 470 sends signals to and receives signals from the network 495. In certain embodiments, the control system 400 includes the network node 470. In certain embodiments, the control system 400 is communicably coupled to the network node 470. The network node 470 is configured to enable the control system 400, and respective components therein, to communicate via the network node 470 to one or more of the backhaul network 480 and the network 495. The network node 470 is configured to be connected to or communicably coupled (for example, logically coupled) with one or more other nodes of other control systems 400, such as of different DERs. Accordingly, through the network node 470, the control system 400 of a first DER is configured to enable a second DER to be indirectly and communicably coupled to the backhaul network 480 and the network 495. That is, the second DER 100 is configured to couple to one or more of the backhaul network 480 and the network 495 via the first DER 100. In certain embodiments, the network node 470 is configured to communicate to the backhaul network 480 using Ethernet, fiber, wireless communication, or any form of Local Area Network, or Wide Area Network technology.

The network node 470 operates as an access point, such as a network router, providing features such as access control, theft prevention, data traffic monitoring, data traffic shaping, network node to network node signaling, and various other features associated with network access and control. The network node 470, as an access point, provides controlled access to the backhaul network, such as controlled access to an internet network. For example, by communicating through the network node 470, the DER 100 is able to bypass a base station. The network node 470 verifies access permission or authority corresponding to a user, a mobile device, or both. The network node 470 can determine if a current subscription is valid for the user or the mobile device and, based on the subscription status, permit or deny access to the core network and, ultimate to the internet via the core network.

The backhaul 480 is communicably coupled to the network node 470 and the network 495, enabling communications between the network node 470 and the network 495. The backhaul network 480 sends signals to and receives signals from the network 495 and one or more network nodes 470. The backhaul 480 enables two-way communication between the node 470 and the network 495. The backhaul 480 can be a wired or wireless network.

The control system 400 is configured to communicate with a number of mobile terminals 490. The control system 400 sends signals to and receives signals from the mobile device 490 via a link 455. The mobile terminal 490 can be a portable computer, a "smart phone", personal data assistant, a touchscreen tablet, an electronic wallet, a vehicle or the like.

Figure 5:
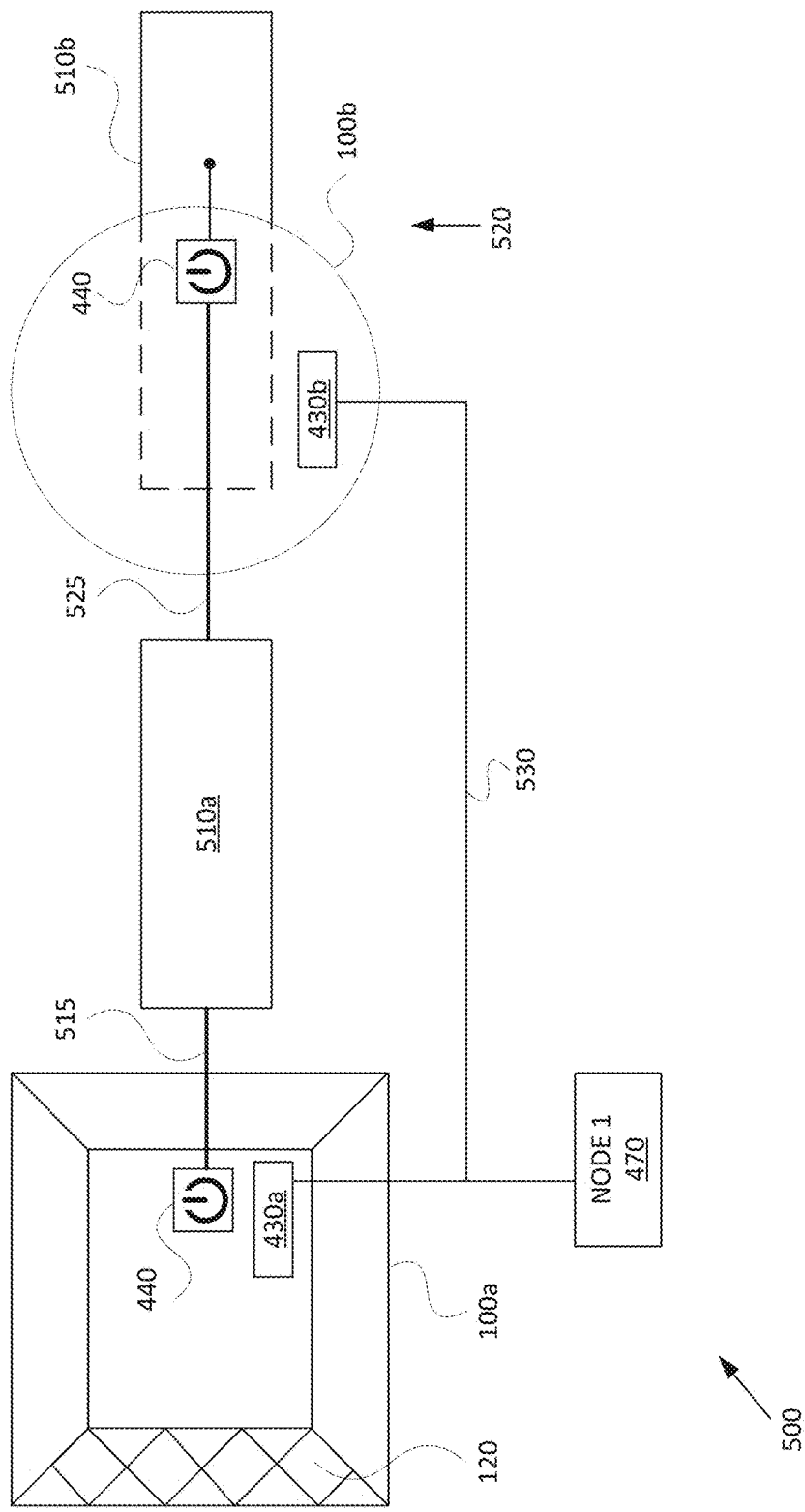
FIG. 5 illustrates a string of DERs according to embodiments of the present disclosure.

FIG. 5 illustrates a string of DERs 500 according to embodiments of the present disclosure. Although certain details will be provided with reference to the components of the string of DERs 500, it should be understood that other embodiments may include more, less, or different components. The string of DERs 500 includes a number of DERs, such as DERs 100a and 100b. Each of the DERs 100a and 100b contains a control system 400. The DERs 100a and 100b are communicably coupled to a common node, such as network node 470, thereby establishing an interlinked string of DERs 500. As described in further detail below, a set of surface reflectors 500 may include various embodiments of DERs and DER assemblies as well as various quantities of the DERs.

DER 100a is embodied as a truncated pyramid pavement marker having reflective material on at least one side. The DER 100a includes a power source 440 configured as a port connected to an external power source 510a via a conductor 515. In certain embodiments, the external power source 510a and 510b is embodied as one or more of: a lane marker; pedestrian marker; or other road or pedestrian way markings. The solar power panels 510a and 510b include a photovoltaic material that converts solar light or solar energy into electricity. For example, the external power source 510a and 510b includes a plurality of photovoltaic cells configured to convert solar energy into electrical energy, such as a plurality of solar cells or a solar power panel. The conductor 515 can be any suitable conductor. The DER 100a includes a communication interface 430 that is coupled to the external network node 470. The connection between the communication interface 430 and the external network node 470 may be on the surface or below the surface of the object to which the DER 100 is attached.

The DER 100b and the solar power panel 510b together form a DER assembly 520. The DER assembly 520 includes a plurality of power sources 440 and 510b.

The DER 100b is embodied as a truncated sphere pavement marker having a reflective material disposed on the entire surface. The DER 100b includes a power source 440 configured as a power port or power interface. The power port or power interface 440 is adapted to connect to a plurality of different power sources (510b, 510a). In certain embodiments, as illustrated in FIG. 5, a portion the solar power panel 510b is disposed beneath, or otherwise in physical contact with, the housing 460, and another portion is disposed outside the housing 460. In certain embodiments, the DER assembly 520 does not include a portion of the external power source (e.g., solar power panel) 510b contained within the housing 460.

The DER 100b includes communication interface 430b. The communication interface 430b of DER 100b is coupled to (e.g., in data communication with) the communication interface 430a of DER 100a, which is connected to a node 470. Where one of the communication interfaces 430a and 430b is connected to the network node 470. The connection between the communication interfaces 430a and 430b of the DERs 100a and 100b, forms a daisy chain 530. In certain embodiments, the daisy chain 530 is a logical daisy chain. The daisy chain 530 enables a communication interface 430b that is not directly connected to the network node 470 to connect to the node 470 via the connection to a communication interface 430 of the first DER 100a, which is coupled to the network node 470. The daisy chain 530 may extend by connecting a subsequent DER 100c to one of the communication interfaces 430b and 430a of either the surface reflector 100b or the surface reflector 100a.

Figure 6:
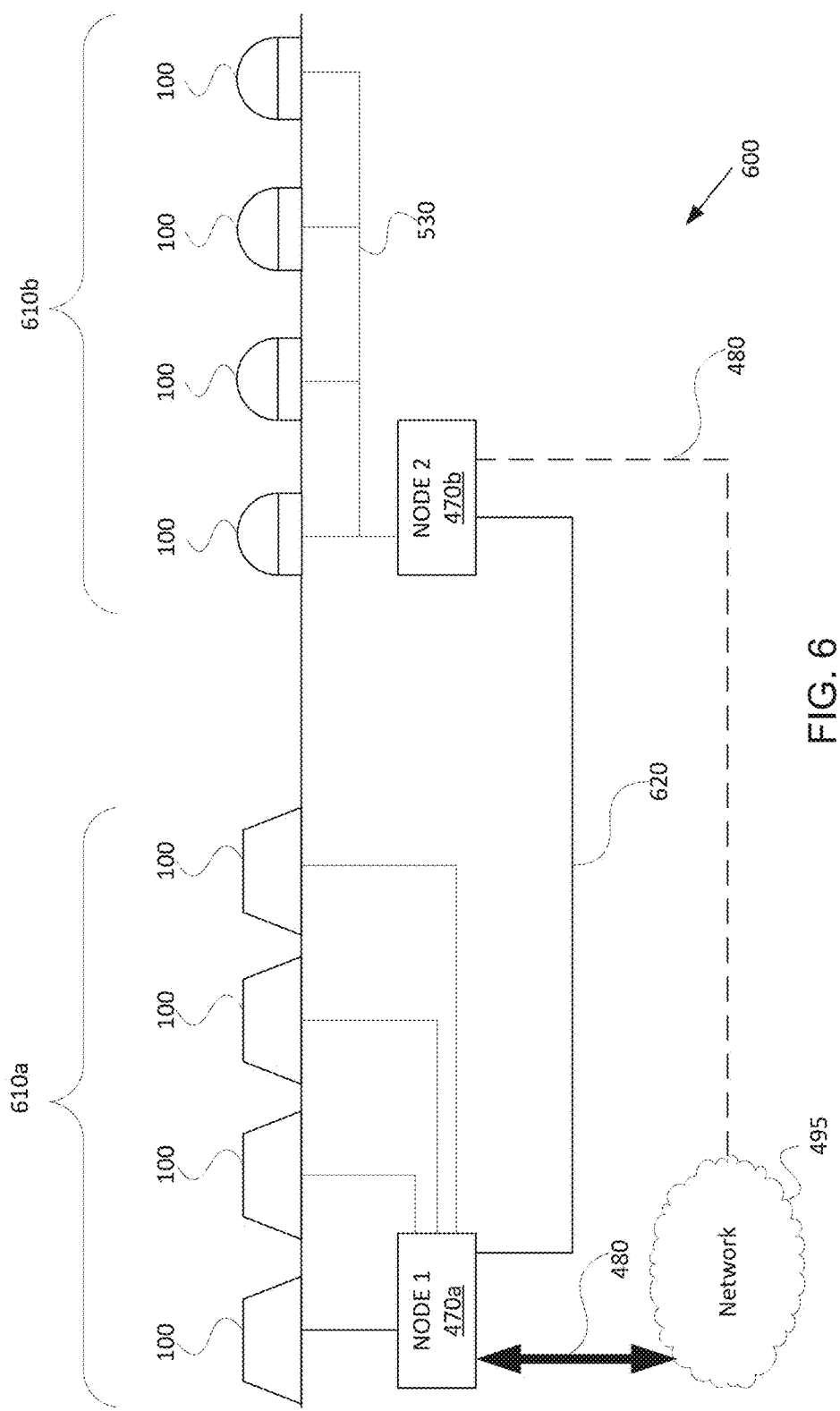
FIG. 6 illustrates a network of DERs according to embodiments of the present disclosure.

FIG. 6 illustrates a network of DERs according to embodiments of the present disclosure. The embodiment of the DER network 600 shown in FIG. 6 is for illustration only. Other embodiments could be used without departing from the scope of this disclosure. Although in FIG. 6, each set of DERs 610 includes four surface reflectors, a set of DERs 610 can include any number of DERs. In certain embodiments, a set of DERs 610 spans a quarter of a mile (1609 meters).

The network of DERs 600 includes a plurality of sets of DERs. For example, the network of DERs 600 includes a first set of DERs 610a and a second set of DERs 610b. Network node 470b of a second set of DERs 610b is connected to network node 470a of a first set of DERs 610a. In certain embodiments, the network nod 470b is logically connected to network node 470a. The first set of DERs 610a is connected to the backhaul network 480. The connection 620 between the network nodes 470a and 470b, in which one of the first network nodes 470a is connected to the backhaul 480, forms a daisy chain 620 of nodes. The daisy chain 620 enables network node 470b to connect to the backhaul 480 via the connection to the network node 470a of the first set of DERs 610a, which is coupled to the backhaul 480 directly (for example, wherein a signal from the network node 470a is not received by an intermediary before the backhaul network 480 receives the signal). In certain embodiments, the daisy chain 620 is a logical daisy chain such that the second network node 470b sends signals to and receives signals from the first network node 470a via the backhaul network 480 and the network 495. The daisy chain 620 can be extended by connecting a subsequent network node 470 of another set of DERs 610 to either the network node 470a or the network node 470b. In certain embodiments of the network of DERs 600, the first network node 470a is connected to the backhaul network 480, and the second network node 470b is directly coupled to the backhaul network 480 independent of the daisy chain 620 connection. In certain embodiments of the network of DERs 600, the first network node 470a is connected to the backhaul network 480, and the second network node 470b is coupled to the backhaul network 480 through one or more of a direct connection independent of the daisy chain 620 and through the first network node 470a via the daisy chain 620. For example, the second set of DERs 610b select to the backhaul network via the independent direct connection to the backhaul network 480 or alternatively via the daisy chain to the first network node 470a. In certain embodiments of the network of DERs 600, the daisy chain is extended by connecting either the network node 470a or the network node 470b to a third network node 470 (of a third set of DERs 610) that is directly connected to the backhaul network 480. In certain embodiments, when a plurality of network nodes 470a and 470b have established a communication (such as a channel of communication) with the network 495, each network node 470 sends signals to and receives signals from the other network nodes 470. For example, the first network node 470a sends signals to and receives signals from the second network node 470b via one or more of the backhaul network 480 and the network 495.

The set of DERs 610a includes truncated pyramid shaped surface reflectors. Each DER of 610a includes a communication interface 430 that is coupled to the network node 470a. The second set of DERs 610b includes truncated sphere shaped DERs. Each DER of the set 610b includes a communication interface 430 coupled to the communication interface 430 of an adjacent DER, creating a daisy chain to the communication interface 430 that is coupled to the network node 470b. In certain embodiments, the coupling is a logical daisy chain between a first communication interface 430 of a DER of the set 610b and a second communication interface 430 of a second DER of the set 610b that is coupled to the network node 470b.

Figure 7:
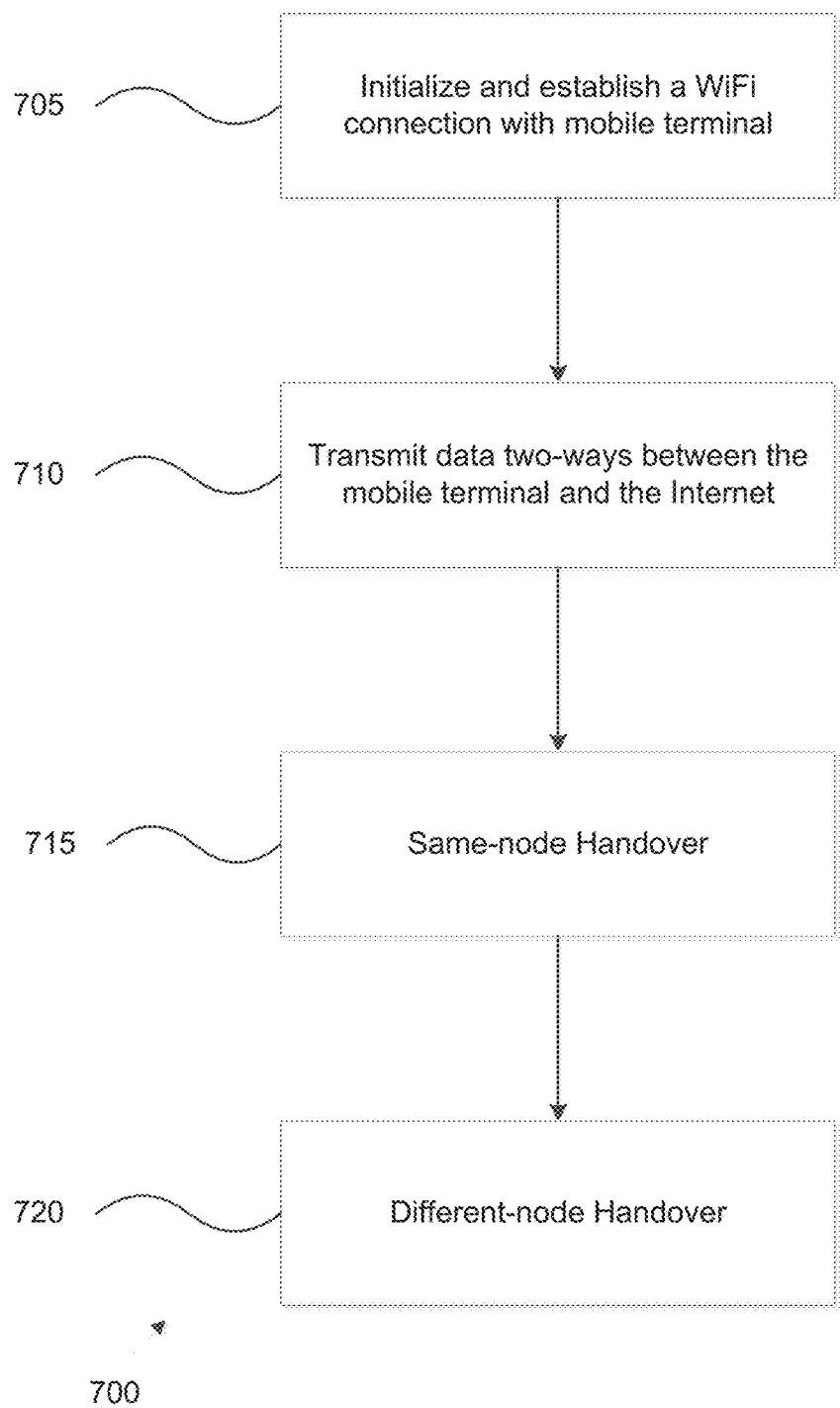
FIG. 7 illustrates a process for providing mobile broadband data access according to embodiments of the present disclosure.

FIG. 7 illustrates a process for providing mobile broadband data access according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a data expansion roadway device.

The process 700 can be performed, for example, by one or more control systems 400, hereinafter referred to in the singular as "the system." The process 700 can be implemented by executable instructions stored in a non-transitory computer-readable medium that cause one or more surface reflector control systems 400 to perform such a process.

In block 705, when a mobile terminal 490 is within a range close enough to communicably couple to at least one control system 400 of a surface reflector, the processing circuitry 410 is within a communicable coupling range and will initialize and establish a wireless connection with the mobile terminal 490. The processing circuitry 410 is configured to determine when the mobile terminal 490 is within a communicable coupling range, such as based in part on the strength of the signal between the mobile terminal 490 and the antenna 450.

In block 710, once a mobile terminal 490 is communicably coupled to at least one DER 100, the DER 100 transmits data back and forth between the mobile terminal 490 and the network 495. The data communication path includes the mobile terminal 490, the antenna 450, the transceiver 420, the processing circuitry 410, the communication interface 430, the node 470, the backhaul 480, and the network 495.

In block 715, as the mobile terminal 490 moves, the mobile terminal 490 moves out of a communicable coupling range of a first DER to which the mobile terminal 490 is connected. The mobile terminal 490 moves into a communicable coupling range of a second DER that belongs to the same set 610 of DERs as the first surface reflector. In certain embodiments, the second DER initiates and establishes a wireless connection with the mobile terminal 490. In response to the establishment a connection of the mobile terminal 490 to the second DER, the first DER terminates the data connection to the mobile terminal 490. This process is referred to as a same-node handover.

In certain embodiments, the processing circuitry 410 is configured to perform a different-node handover in block 720. As the mobile terminal 490 continues to move, the mobile terminal 490 moves out of a communicable coupling range with all of the DERs in the first set of DERs that are coupled to the node of the first DER. In the different-node handover 720, in response to the establishment of a connection with a second DER that does not belong to the same set 610 of DERs as the first DER (e.g., not included in the first set of DERs), the first DER terminates the data connection between the mobile terminal 490 and the first DER. In certain embodiments, the different-node handover process is conducted using a hardwire handover in which the first node and second node are communicably coupled via a wired connection. In certain embodiments, the different-node handover process is conducted using a wireless handover—in which the first node and second node are communicably coupled via a wireless connection. In certain embodiments, one or more of the same node handovers and different node handovers are controlled by a central switch. In certain embodiments, one or more of the same node handovers and different node handovers are controlled by one of the network nodes 470. In certain embodiments, one or more of the same node handover and different node handover are controlled in part by the mobile terminal. In certain embodiments, one or more of the same node handover and different node handover are controlled by one or more components in the backhaul network 480.

Figure 8:
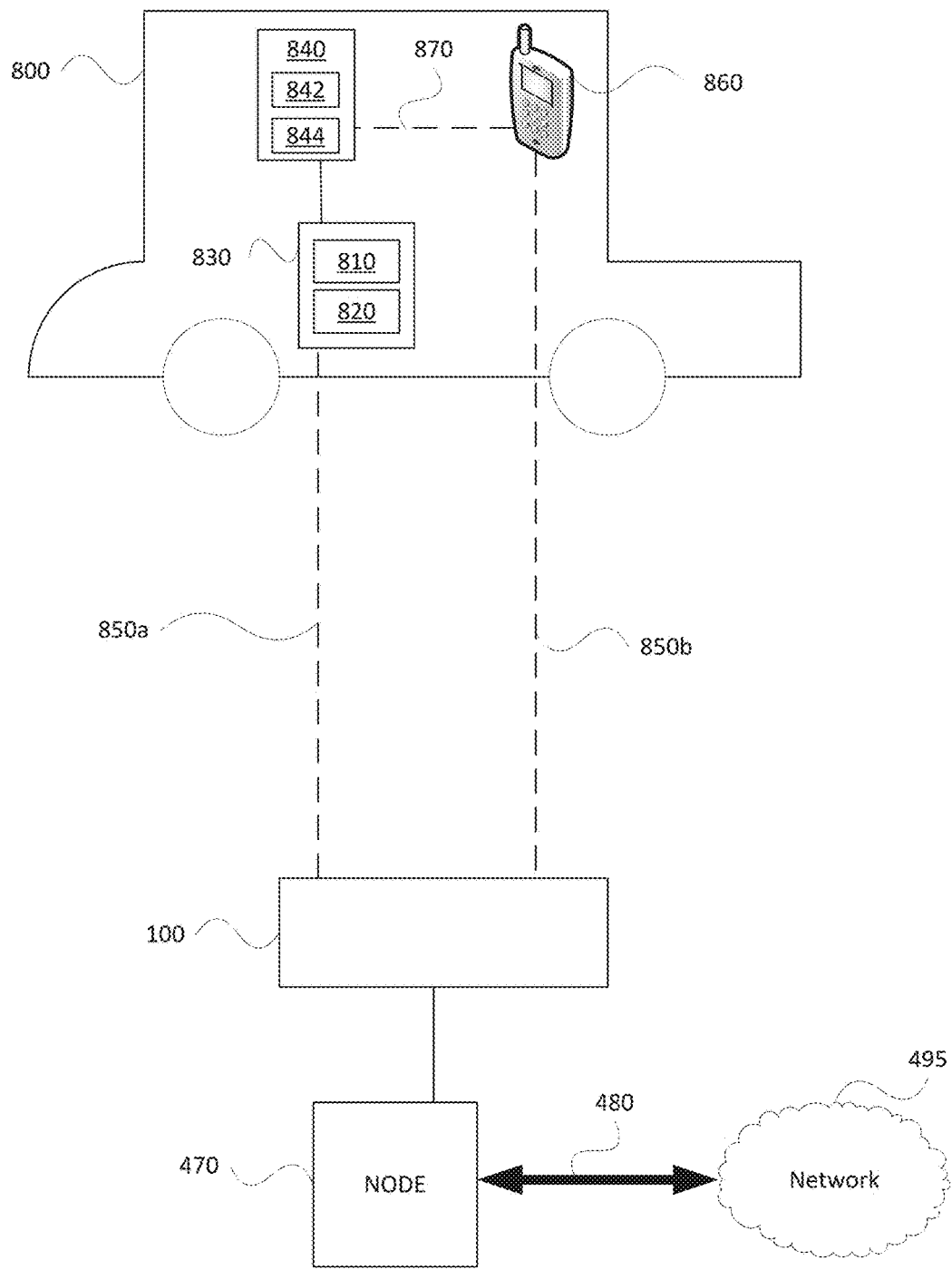
FIG. 8 illustrates a DER providing mobile broadband access according to embodiments of the present disclosure.

FIG. 8 illustrates a DER 100 providing mobile broadband access to a vehicle 800 according to embodiments of the present disclosure. In certain embodiments, the mobile terminal 490 is a vehicle 800 (e.g., car; truck; van; bus) that includes an antenna 810 adapted to receive wireless data signals from one or more DERs 100. The control system 400 of the DER 100 sends signals to and receives signals from the vehicle 800 via a link 850a.

The vehicle 800 includes a transmitter 820 to send wireless data signals to one of more DERs 100. In certain embodiments, the vehicle's antenna 810 and transmitter 820 (together "vehicle transceiver" 830) are located physically close to the ground, such as at or near the bottom of the vehicle, under the passenger cabin. When the DER 100 is located on the street and the vehicle transceiver 830 is disposed under the vehicle, the vehicle can receive a stronger signal link 850a from the DER 100 as compared with the strength of the signal link 850b to the mobile terminal 860 within the passenger cabin. In certain embodiments, the vehicle's antenna 810 positioned on the vehicle in any one or more of: atop, on a side, internally, externally, beneath, the so forth, to enhance transmission and reception of signals between the antenna 810 and the DER 100.

In certain embodiments, the antenna 810 is coupled to a control unit located in the vehicle 800. The vehicle's control unit 840 includes processing circuitry, a memory 842, and an interface 844 to link 870 to a mobile terminal 860 within the passenger cabin of the vehicle. The link 870 can be a wired or wireless link, such as via BLUETOOTH Low Energy, infrared, Universal Serial Bus (USB), or any other suitable data transmission medium link. The control unit 840 is adapted to boost the strength of the signal from the DER 100 to the mobile terminal 860. For example, when the signal strength link 850b (between the DER 100 and the mobile terminal 860 within the passenger cabin of the vehicle) is weak compared to the signal strength of link 850a (between the DER 100 and the vehicle 800), then the DER 100 sends signals to the mobile terminal 860 through the control unit 840 and through the vehicle interface link 870 to the mobile terminal 860.

In certain embodiments, the control unit 840 includes a memory 842 adapted to buffer data transferred from the network 495 to the mobile device 860. The control unit 840 monitors a transfer of data from the network 495 to the memory of the mobile terminal 860. In the event a connection between the mobile terminal 860 and the control unit 840 is lost or severed during a download of a file from the network 495, the control unit 840 continues to download data from the network 495 via the connection 850a between the control unit 840 and the DER 100. The control unit 840 stores the download data in the memory 842 for retrieval by the mobile terminal 860. Upon a re-connection between the mobile terminal 860 and the controller 840, the downloaded data stored in the memory 842 is transferred to the mobile terminal 860.

As an illustrative and non-limiting example: a user commences downloading a movie. During the download of the movie, the user exits the vehicle 800 along with the mobile terminal 860, thus severing the connection between the mobile terminal 860 and the control unit 840. Thereafter, the control unit 840 continues to download and store the remaining portion of the movie. When the user returns to the vehicle and re-connects the mobile terminal 860 to the control unit 840 via the interface 844, the remaining portion of the movie is downloaded to the mobile terminal. The mobile terminal can prompt the user to request a download of the buffered data after the marker. Alternatively, in response to a re-establishment of the link 870, the controller 840 can initiate the download of the buffered data without user interaction. Therefore, the user is able to complete the download without being required to re-start the entire download.

In certain embodiments, the control unit 840 stores a file marker indicating when the download was interrupted. The control unit 840 stores a first file marker in the memory 842. The file marker identifies the portion (transferred portion) of the file that has been transferred to the memory of the mobile terminal 860 and the portion (un-transferred portion) of the file that has not been transferred to the memory of the mobile terminal 860. If before the entire file is transferred to the memory of the mobile terminal 860, the user removes the mobile terminal 860 from the vehicle 800 or otherwise disconnects the mobile terminal 860 from interface link 870, then the control unit 840 will continue to download the un-transferred portion and store or buffer the un-transferred portion in the memory 842 of the control unit 840. When the mobile terminal 860 re-establishes the link 870 to the control unit 840 through the interface 844, then un-transferred portion of the data is downloaded to the memory of the mobile terminal 860. That is, in response to a reconnection of the mobile terminal 860 with the control unit 840, the download is re-initiated at the point indicated by the marker. The mobile terminal can prompt the user to request a download of the un-transferred portion of the data after the marker. Alternatively, in response to a re-establishment of the link 870, the controller 840 can initiate the download of the un-transferred data after the marker without user interaction. In both cases, however, the data downloaded prior to the marker is not required to be downloaded again.

Figure 9:
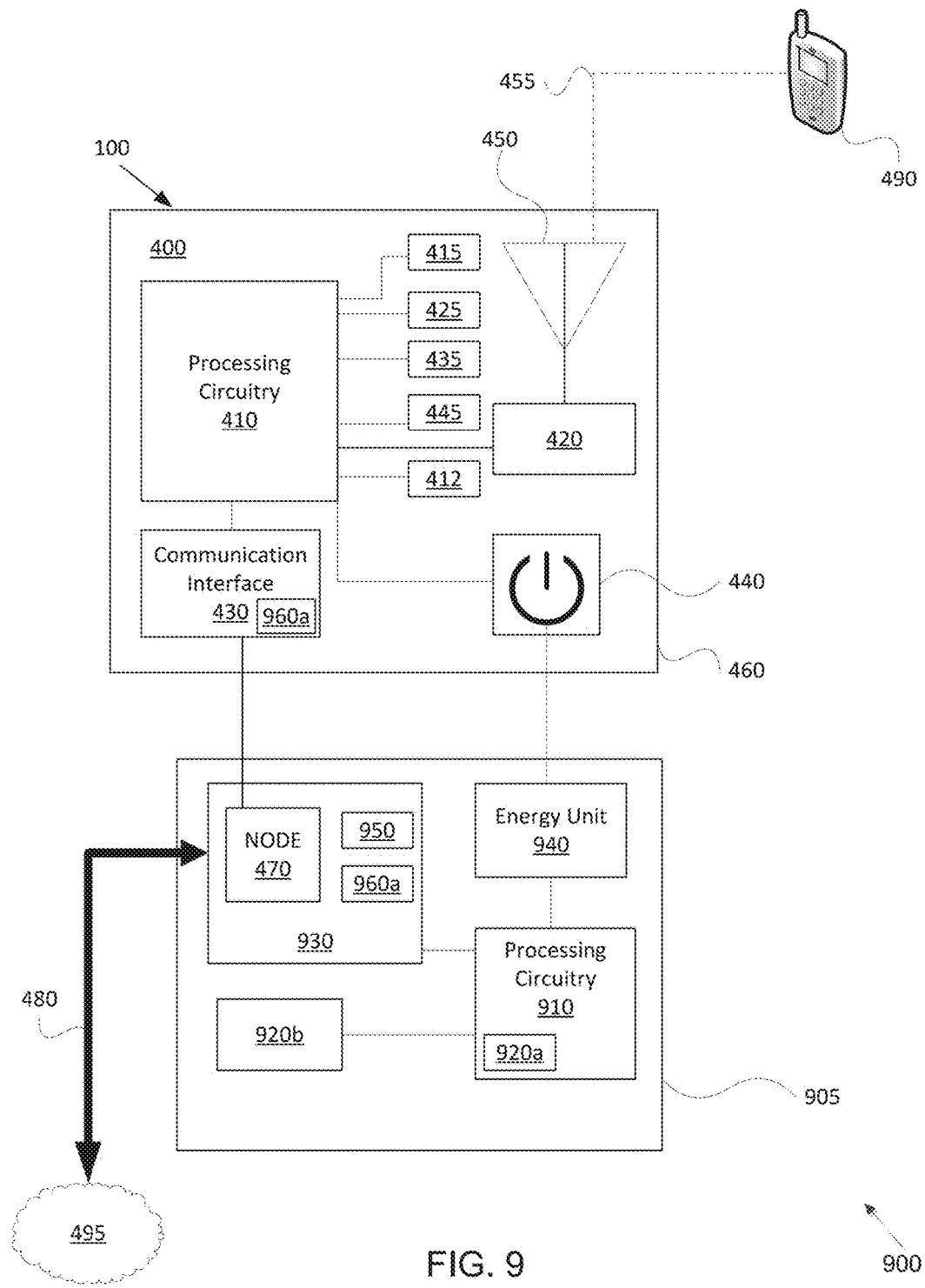
FIG. 9 illustrates a DER system according to embodiments of the present disclosure.

FIG. 9 illustrates a DER system 900 according to embodiments of the present disclosure. Although certain details will be provided with reference to the components of the DER system 900, it should be understood that other embodiments may include more, less, or different components. The DER system 900 includes a DER 100 coupled to a mobile terminal 490 and to a controller unit 905. The DER 100 includes the control system 400.

The controller unit 905 operates as an access point, providing features such as access control, theft prevention, data traffic monitoring, data traffic shaping, network node to network node signaling, and various other features associated with network access and control. In certain embodiments, the controller unit 905 includes the features and functions of the node network 470. In certain embodiments, the controller unit 905 and the network node 470 are interchangeable. The controller unit 905 is coupled to the backhaul network 480 via a wire line or wireless connection. The controller unit 905 couples to one or more computer networks via the backhaul network 480.

The controller unit 905 includes processing circuitry 910 configured to control components within the controller unit 905. In certain embodiments, the processing circuitry 910 controls the memory 920*a-b*, the communication interface 930, and the energy unit 940. The controller unit 905 establishes a secure channel for sending and receiving control and data signals to and from one or more DERs 100. The processing circuitry 910 provides a virtual private network (VPN) initialization and termination for communications between the controller unit 905 and the DER 100. That is, the controller unit 905 communicates with the DER 100 via a secured channel using a VPN. In certain embodiments, the processing circuitry 910 is configured to send encrypted data and to decipher encrypted data received from the DER 100. That is, the processing circuitry 910 and control system 400 establish an encryption agreement or share a common encryption key used to secure the data transmitted between the controller unit 905 and the DER 100.

The controller unit 905 includes memory 920 configured to store instructions for the processing circuitry 910 and to store information used in functions performed by the processing circuitry 910. In certain embodiments, the processing circuitry 910 includes the memory 920*a* within the same integrated circuitry. In certain embodiments, the processing circuitry 910 is coupled to the memory 920*b*.

The controller unit 905 includes a communication interface 930 configured to send and receive control signals and data between the DER 100 and the controller unit 905. The communication interface 930 is coupled to the backhaul network 480 via a wire line or wireless connection. The controller unit 905 uses the communication interface 930 to send signals to and receive signals from the network 495 via the backhaul network 480. That is, the controller unit 905 is communicably coupled to the network 495 through the backhaul network 480. The communication interface 930 includes the network node 470, a GPS receiver 950, and an optical communication terminal 960.

The GPS receiver 950 is configured to locate GPS satellites and to deduce the location of the controller unit 905 using signals received from the satellites. In certain embodiments, the controller unit 905 sends a message indicating the location to each DER 100 within the set of DERs 610 controlled by that controller unit 905. The location message can include a GPS location, a geographic coordinate system coordinate pair, an approximate address, and an intersection. In response to receiving the location message, the DER 100 saves the location information in memory 412.

For example, the DER 100 receives and stores the location information derived from the GPS 950 from the controller unit 905. The user of the mobile terminal 490 uses a maps or navigation application to track a selected path from point A to point B. Between point A and point B, the mobile terminal 490 loses connection with GPS satellites and cannot determine the location of the mobile terminal. The DER 100 forwards the location information to the mobile terminal 490, thereby enabling the mobile device's maps or navigation application to determine the location of the mobile terminal. Accordingly, the DER system 900 enhances the user's GPS navigation experience.

The optical communication terminal 960 configured to send and receive signals via light, wherein the signals comprise data or control signals. That is, the optical communication terminal 960 sends and receives signals by way of an optical communication channel. The optical communication terminal 960 includes an input/output (I/O) terminal configured for receiving input signals via a light input and sending output signals via a light output. In certain embodiments, the optical communication terminal 960 is configured to communicate using laser I/O signals. In certain embodiments, the optical communication device is configured to communicate using white space frequency. As an example, when television channel 4 and channel 5 represent the government designated frequencies of 8.0 mega-Hertz and 9.0 mega-Hertz, then white space frequency represents band of 8.5-8.9 mega-Hertz that the government has not reserved for a specified purpose (e.g., television channel 4 and 5).

In certain embodiments, the optical communication terminal 960 is configured to communicate photonically, using photons of light. Photonic communication uses a subset of a light wave and transmits signals faster than signals transmitted via laser light. The optical communication terminal 960 is configured to detect a breach in the security of the signal transmission channel. For example, the optical communication terminal 960 detects an interruption of light within the transmission path and interprets the interruption as an indication of a breach of security. As another example, the optical communication terminal 960 detects a change in polarity of the photons of a photonic signal within the transmission path and interprets the changed polarity as an indication of a breach of security.

In certain embodiments, the communication interface 430 of the control system 400 includes an optical communication terminal 960. For example, a first DER 100*a* and a second DER 100*b* each include an optical communication terminal 960 and communicate by laser or photonically with each other using the respective optical communication terminals 960. As another example, the DER 100 includes an optical communication terminal 960*b* and sends and receives signals by laser or photonically with the optical communication terminal 960*a* of the controller unit 905.

The controller unit 905 includes an energy unit 940 configured to provide electric energy to the constituent electrical components of the controller unit 905. The energy unit 940 receives electricity from one or more of the following sources: a local utility power line, heat, such as geothermal heat, and vibrations. In certain embodiments, the energy unit 940 is configured to convert geothermal energy into electricity for the controller unit 905. In certain embodiments, the energy unit 940 is configured to convert energy from road vibrations into electricity for the controller unit 905. In certain embodiments, the energy unit 940 is configured to transmit wireless power signals to the power source 440, and the wireless power signals charge an energy storage device within the power source 440. The wireless power transmission transmitter of the energy unit 940 is configured to couple to the wireless power receiver of the DER's power source 440, such as a shared frequency coupling.

That is, in certain embodiments, the power source 440 within the control system 400 is configured to receive and use wireless power to supply electricity to components within the control system 400 and to charge an energy storage device, such as a battery.

According to embodiments of the present disclosure, The DER system 900 is configured to receive information from a police officer mobile 490, such as information regarding the geographical location of a police officer. In certain embodiments, the DER system 900 is configured to determine the proximal distance of the police officer from the DER 100 based on the geographical location of a police officer.

The DER system 900 is configured to implement a process for reporting vehicle velocity and identification information as will be described more particularly in reference to FIGS. 9 and 11.

Figure 10:
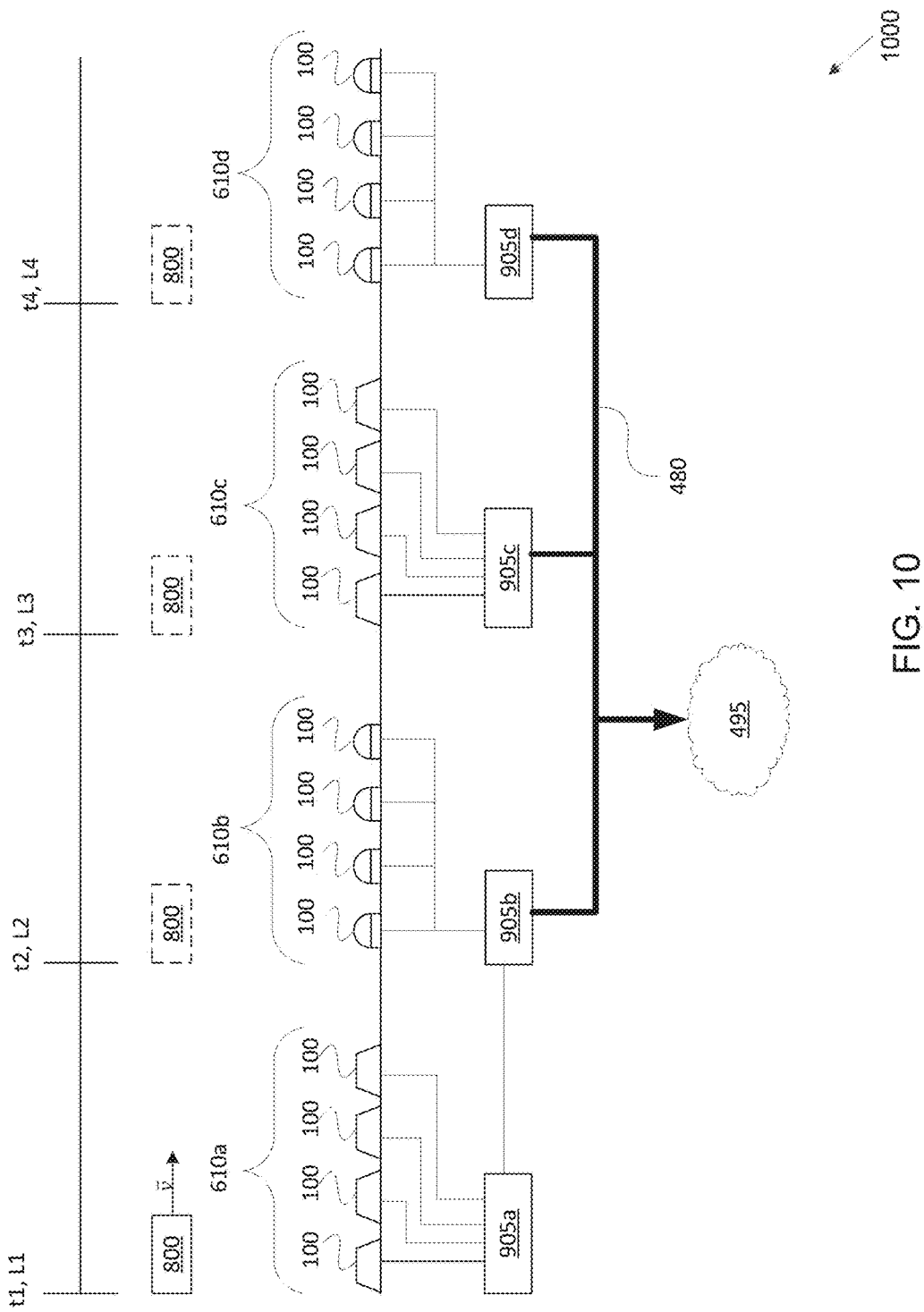
FIG. 10 illustrates a network of DERs according to embodiments of the present disclosure.

FIG. 10 illustrates a network of DERs 1000 according to embodiments of the present disclosure. Although certain details will be provided with reference to the components of the network of DERs 1000, it should be understood that other embodiments may include more, less, or different components. Although in FIG. 10, the network of DERs 1000 includes four controller units 905*a-d*, each controlling a corresponding set of DERs 610*a-d* of four surface reflectors each, the network of DERs 1000 can include any number of sets of DERs 610. The components of FIG. 10 share the features and functions of the components of FIG. 6.

The network of DERs 1000 includes a plurality of sets of DERs. For example, the network of DERs 1000 includes a first set of DERs 610*a*, a second set of DERs 610*b*, a third set of DERs 610*c*, and a fourth set of DERs 610*d*. The first controller unit 605*a* controls the first set of DERs 610*a*; the second controller unit 605*b* controls the a second set of DERs 610*b*; the third controller unit 605*c* controls the third set of DERs 610*c*; and the fourth controller unit 605*d* controls the a fourth set of DERs 610*d*.

The controller unit 905*a* of a first set of DERs 610*a* is connected to controller unit 905*b* of the second set of DERs 610*b* via a wire line or a wireless connection, forming a daisy chain from the controller unit 905*a* to the backhaul network 480. That is, the controller unit 905*a* is not directly connected to the backhaul network 480, but instead, the second controller unit 905*b* is an intermediary between the backhaul network 480 and the first controller unit 905*a*. The first controller unit 905*a* is coupled to the controller units 905*c* and 905*d* via a logical connection in combination with the wire line or wireless connection to the backhaul network 480. The first controller unit 905*a* sends control signals and data signals to the controller units 905*c* and 905*d* via the logical connection (through 905*b* and 480) and in return, receives response messages from the controller units 905*c* and 905*d*.

Figure 13:
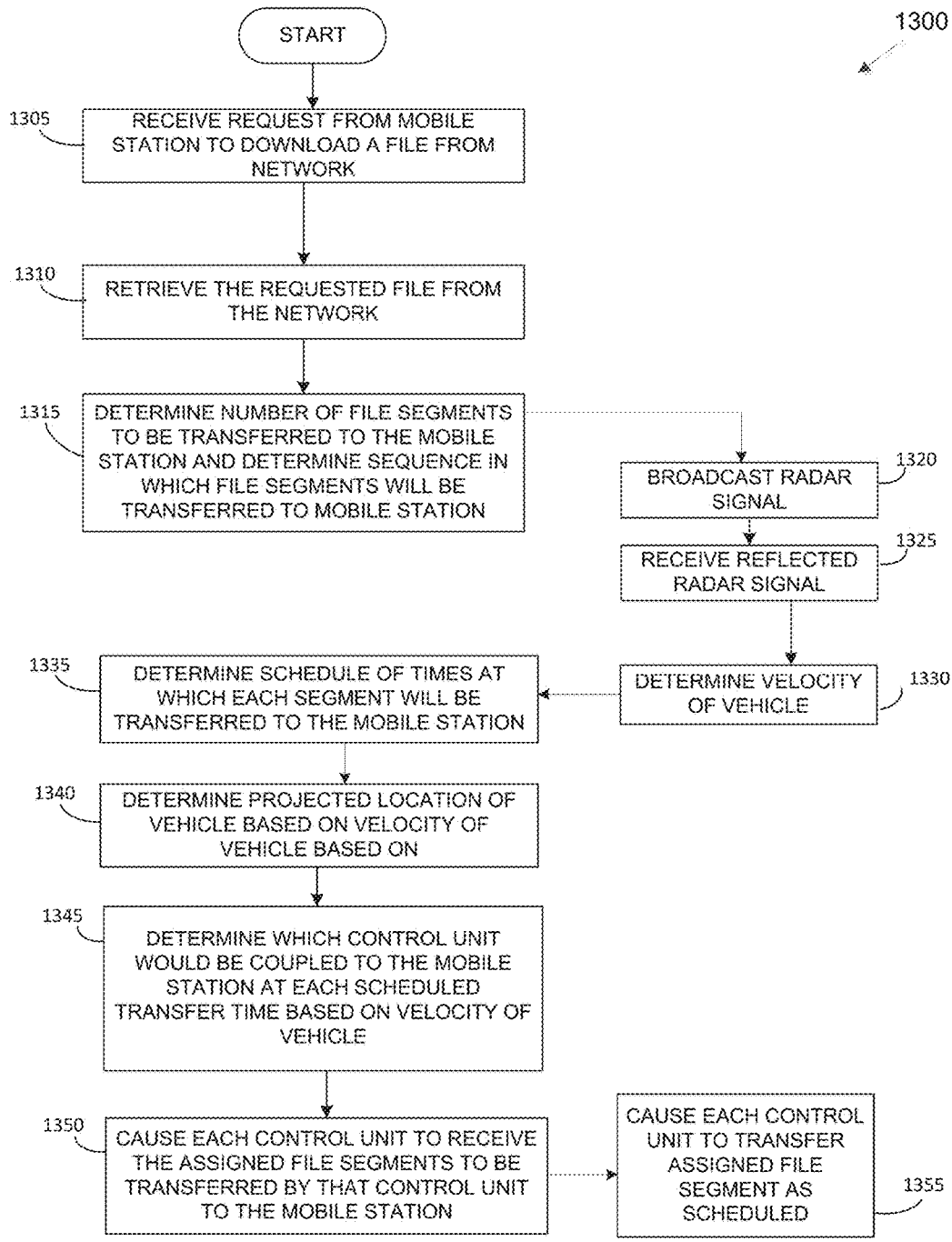
FIG. 13 illustrates a process for sequentially transmitting segments of a data file to a mobile station based on projected geographical location of the mobile station according to embodiments of the present disclosure.

In reference to FIGS. 10 and 13, the network of DERs 1000 is configured to implement a process for sequentially transmitting segments of a data file to a mobile station 860 within a vehicle 800 based on projected geographical location of the vehicle 800.

Figure 11:
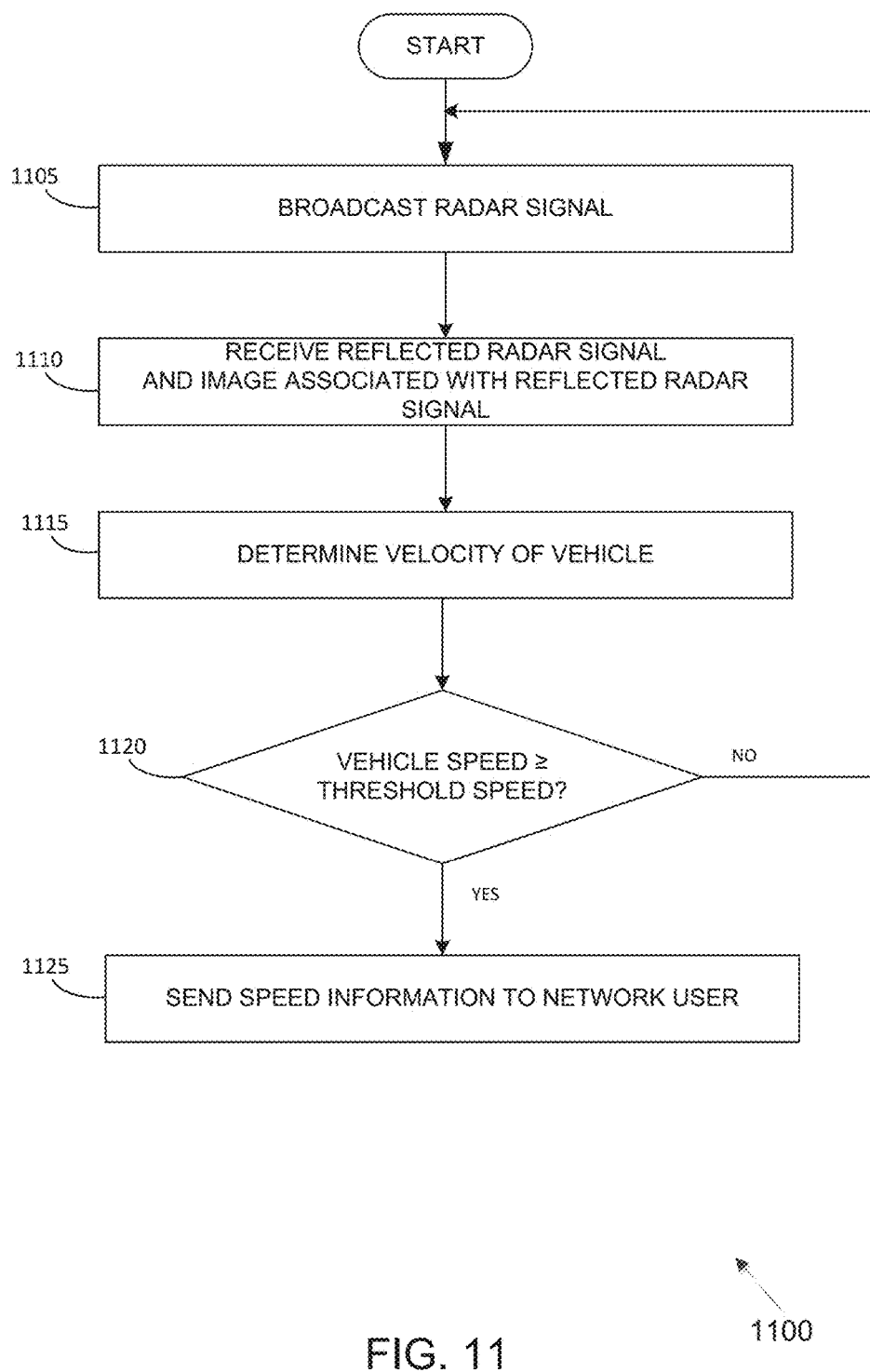
FIG. 11 illustrates a process for reporting vehicle velocity and identification information according to embodiments of the present disclosure.

FIG. 11 illustrates a process 1100 for reporting vehicle velocity and identification information according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a data expansion roadway device.

A vehicle 800 travels in near proximity to a DER 100 at a velocity $\vec{v}$, including a direction and a speed. In block 1105, the DERs 100 broadcasts one or more RADAR signals. When the RADAR signals are incident upon a vehicle 800 or other object, the signals reflect off the vehicle 800 and return toward the RADAR transceiver within the RADAR unit 415.

In block 1110, the RADAR unit 415 receives the reflected return RADAR signals. In certain embodiments, block 1110 further comprises receiving an image associated with the reflected return RADAR signals. The processing circuitry 410 is configured to instruct the camera 425 to capture a picture of the object the broadcasted RADAR waves were incident upon. That is, the camera captures an image of the vehicle 800 or vehicle license plates corresponding to the reflected return RADAR signals.

In block 1115, the control system 900 determines the velocity $\vec{v}$ of the vehicle 800. In certain embodiments, the control system 400 of the DER 100 determines the velocity $\vec{v}$ of the vehicle using the waveform information from the RADAR unit 415. In certain embodiments, the controller unit 905 determines the direction and speed of the vehicle 800. The controller unit 905 makes the determination using information received from the RADAR unit 415 of the DER 100.

In block 1120, the control system 900 compares a threshold speed to the vehicle speed determined in block 1115. Examples of the threshold speed include: a user determined speed to be monitored, a specified speed stored within the control system, a speed limit corresponding to the location of the DER 100, a speed above the speed limit selected by a law enforcement officer seeking to confront or issue citations to speed limit violators. The control system 900 determines whether the vehicle speed is greater than or equal to the threshold speed. When the vehicle speed is at least the threshold speed, then the control system 900 moves to block 1125. When the speed is less than the threshold speed, the control system moves to block 1105.

In certain embodiments, in block 1125, the control system 900 sends the speed information to an external device. For example, the control system 900 can send the speed information to one or more of a computer within the network 495, a network user, an operator of the vehicle, or a third party. The speed information includes the image of the vehicle captured in block 1110, the velocity $\vec{v}$ of the vehicle determined in block 1115, and the results of the speed comparison derived in block 1120.

Figure 12:
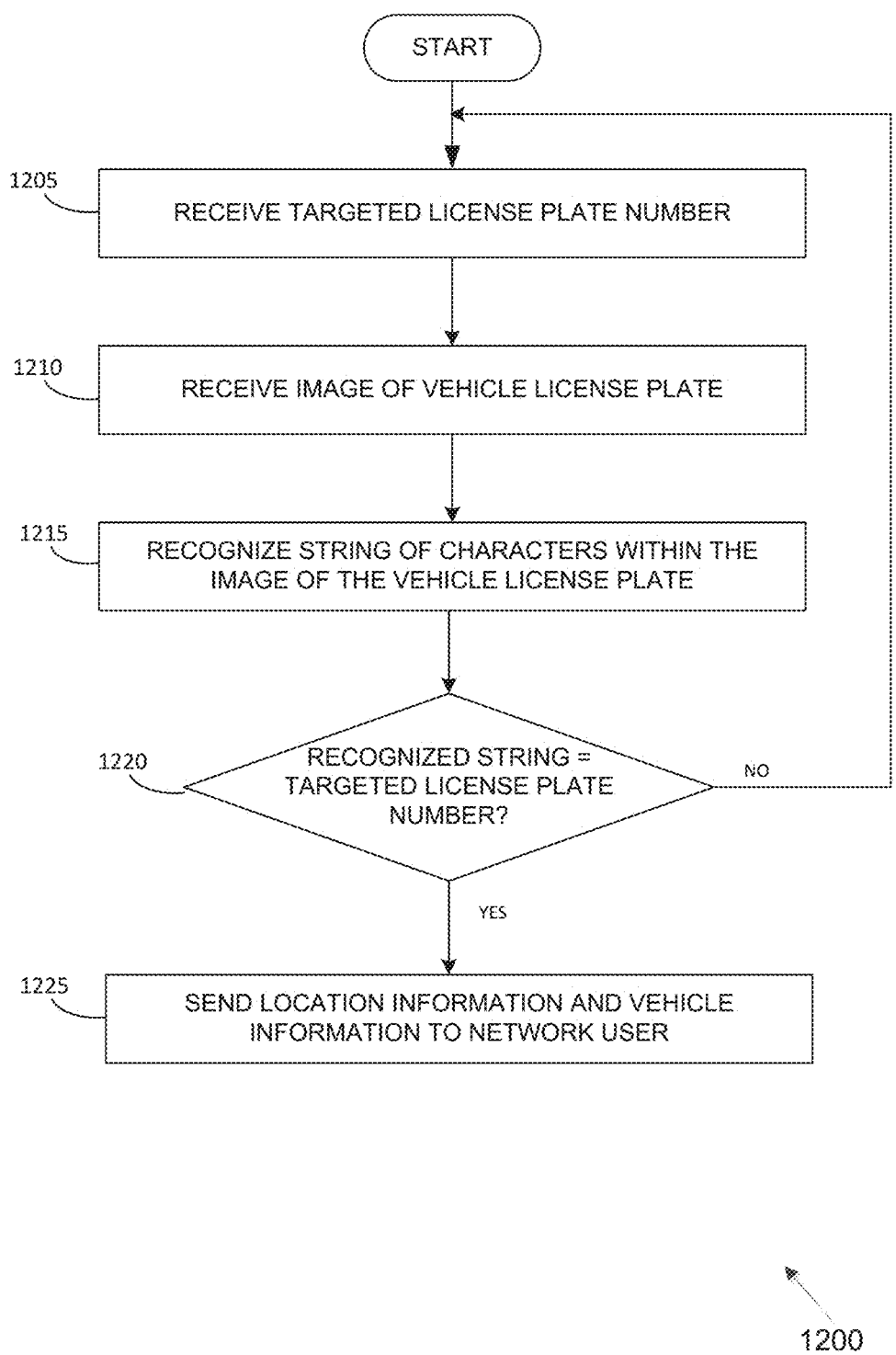
FIG. 12 illustrates a process for reporting vehicle location and identification information according to embodiments of the present disclosure.

FIG. 12 illustrates a process 1200 for reporting vehicle location and identification information according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a data expansion roadway device.

At the start, a vehicle 800 travels nearby a DER 100 at a velocity $\vec{v}$, including a direction and a speed. In block 1205, the control system 400 of the DER 100 receives a targeted license plate number. For example, the mobile phone within the vehicle receives an AMBER (America's Missing: Broadcast Emergency Response) alert containing the color and license plates number of a vehicle of interest and forwards the AMBER alert information to the control system 400 via the link 455. As another example, the network 495 includes a government law enforcement system or a government department of transportation system. A computer within the network sends a message to the controller unit 905 indicating targeted license plates numbers of one or more vehicles used in an illegal act. The controller unit 905 forwards the targeted license plates numbers to at least one of the DERs 100 within the set of DERs 610 controlled by the controller unit 905. The targeted license plates numbers are stored in memory 412, 920a-b.

In block 1210, the camera 425 captures an image of the vehicle 800, including the vehicle license plate and the color of the vehicle. The image received for processing by processing circuitry 410 or 910.

In block 1215, the processing circuitry 410 or 910 recognizes the string of characters within the image that was captured in Block 1210. The processing circuitry 410,910 uses an OCR capability to determine the characters in within the image of the vehicle license plate. In certain embodiments, the processing circuitry 410,910 is configured to determine a color of the car bearing the license plate in the image.

In block 1220, the processing circuitry 410 or 910 compares one or more targeted license plate numbers to the string of characters recognized in image of the vehicle license plate. When the string of characters recognized in image of the vehicle license plate is substantially similar to or equal to a targeted license plate number, the control system moves to block 1225. When matching license plate number is found, the control system moves to block 1205. In certain embodiments, the processing circuitry 410,910 looks for matching colors by comparing the color of the car to the color in the AMBER alert.

In block 1225, the control system 900 sends location information and the vehicle information to a computer within the network 495 or a network user. The vehicle information includes the color of the vehicle, the string of characters recognized in the image of the vehicle license plate. The location information includes the location of the DER. In certain embodiments, the vehicle information includes the velocity $\vec{v}$ of the vehicle.

FIG. 13 illustrates a process 1300 for sequentially transmitting segments of a data file to a mobile station based on projected geographical location of the mobile station according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a data expansion roadway device.

In block 1305, mobile terminal 860 sends a request to the DER 100 to download a file from the network 495. In certain embodiments, the mobile terminal can be associated with a user that is not within a motor vehicle 800. The DER 100 receives the request to download a file from the mobile terminal 860.

In block 1310, the control system 400 of the DER retrieves the requested file from the network 495 via the control unit 905 and the backhaul network 480. The processing circuitry 910 of the controller unit 905a-d is configured to receive request to retrieve a file from the network 495. In response to receiving the request to retrieve the file, the controller unit 905a-d retrieves the file from a location within the network 495. The processing circuitry 910 of the controller unit 905a-d is configured to determine the number of file segments into which the retrieved file is divided. The processing circuitry 910 is configured to assemble scrambled file segments into a time dependent sequential order when the retrieved file is divided in to file segments and transmitted out of time dependent order for increased the speed of transmission. For example, a movie file may be divided into four file segments A-D. The network computer storage of the movie file may transmit to the controller unit 905a the file segment A (containing the first 10 minutes of the movie), followed by the file segment D (containing the fourth 10 minutes of the movie), then file segment C (containing the third 10 minutes of the movie), and then file segment B (containing the second 10 minutes of the movie). The processing circuitry 910 uses a marker within each file segment to determine the time dependent order of the file segments, such as determining that file segment A contains the first portion of the file. The processing circuitry 910 assembles file segment D to be immediately follow file segment C; assembles file segment C to be immediately follow file segment B; and assembles file segment B to be immediately follow file segment A. That is, processing circuitry 910 receives a scrambled set of file segments {A, D, C, B} and assembles the file segments into a time dependent sequence {A, B, C, D}.

In block 1315, the controller unit 905a determines the number of file segments to be transferred to the mobile station 860. In some instances, the computer (within the network 495) from which the controller unit 905a retrieves the file divided the file into a number of file segments before the controller unit 905a retrieved the file. In some instances, the controller unit 905a retrieves the requested file from the computer (within the network 495) as one large undivided file. The controller unit 905a is configured to divide the retrieved file into a number of file segments to hasten transmission of the retrieved file to the mobile station 860. The controller unit 905a is configured to further divide the retrieved file segments into a larger number of file segments to hasten the transmission.

Also in block 1315, the controller unit 905a determines a sequence in which the file segments should be transferred to the mobile station 860. For example, the controller unit 905 can determine to first transmit two small, non-consecutive (e.g., file segments A and D) to a DER 100, and next transmit a single file segment C.

In block 1320, the DER 100 broadcasts RADAR signals 1320, such as in block 1105. In block 1325, the DER 100 receives reflected return radar signals, such as in block 1110. In block 1330, the processing circuitry 410, 910 of the DER or the controller unit 905a determines the velocity $\vec{v}$ of the vehicle 800, such as in block 1115.

In block 1335, the controller unit 905a determines a schedule of times at which each file segment should be transmitted to the mobile terminal 860 from a DER 100. The controller unit 905a makes this determination by using the speed and direction of the vehicle 800 that was determined in step 1330, by using the speed of data transfer, and by using the size and number of file segments to be transferred.

For example, the controller unit 905a determines that at a first time t1, the file transfer should begin by transferring file segment A to the mobile terminal 860 and should end before t2. That is, each scheduled file transfer should end before the next schedule file transfer begins. At a second time t2, file segment B should be transferred to the mobile terminal 860. At a third time t3, file segment C should be transferred to the mobile terminal 860. At a fourth time t4, the last file segment D should be transferred to the mobile terminal 860.

In block 1340, the controller unit 905a determines projected locations of the vehicle 800 based on the velocity $\vec{v}$ of the vehicle. For example, a first reference time t1, the controller unit 905a determines that the vehicle 800 is located at a first location L1 using the reflected RADAR signals of block 1325. The controller unit 905a calculates a forecast of the locations of the vehicle 800 at times t2, t3, and t4 (as scheduled in block 1335). The controller unit 905a calculates that the vehicle 800 will be located at projected location L2 at time t2, will be located at projected location L3 at time t3, and will be located at projected location L4 at time t4.

In block 1345, the controller unit 905a determines which control unit would be coupled to the mobile station at each scheduled filed transfer time. The determination is based on the velocity $\vec{v}$ of the vehicle. For example, the controller unit 905a is coupled to the mobile station 860 via the first set of DERs 610a determines that at a first time t1, and that the first controller unit 905a should instruct the first set of DERs 610a to begin transferring file segment A to the mobile terminal 860. The controller unit 905a determines that at a second time t2; that the second controller unit 905b will be coupled to the mobile station 860 via the second set of DERs 610b and should instruct the second set of DERs 610b to begin transferring file segment B to the mobile terminal 860. The controller unit 905a determines that at a third time t3; that the third controller unit 905c will be coupled to the mobile station 860 via the third set of DERs 610c and should instruct the third set of DERs 610c to begin transferring file segment C to the mobile terminal 860. The controller unit 905a determines that at a fourth time t4; that the fourth controller unit 905d will be coupled to the mobile station 860 via the fourth set of DERs 610d and should instruct the fourth set of DERs 610d to begin transferring file segment D to the mobile terminal 860.

In block 1350, the control unit 905a causes each control unit 905a-d to receive an assigned file segment to be transferred by that control unit to the mobile station. The control unit 905a uses the determination of block 1345 that the file segment B is assigned to be transferred by the second controller unit 905b. Accordingly, the controller unit 905a causes the second controller unit 905b to receive the second file segment to be transferred, file segment B. Likewise, the controller unit 905a causes the third controller unit 905c to receive the third file segment to be transferred, file segment C. The controller unit 905a causes the fourth controller unit 905d to receive the fourth file segment to be transferred, file segment D.

In certain embodiments, the controller unit 905a causes the second controller 905b to receive the assigned file segment by sending the assigned file segment to the second controller 905b via mutual coupling. In certain embodiments, the controller unit 905a causes the second controller 905b to receive the assigned file segment by sending an signal to the second controller 905b instructing the second controller 905b to retrieve the assigned file segment from the network.

In block 1355, the controller unit 905a instructs each control unit 905a-d to transfer the respective assigned file segment to the mobile station 860 at the scheduled time (according to the schedule of block 1335).

Figure 14:
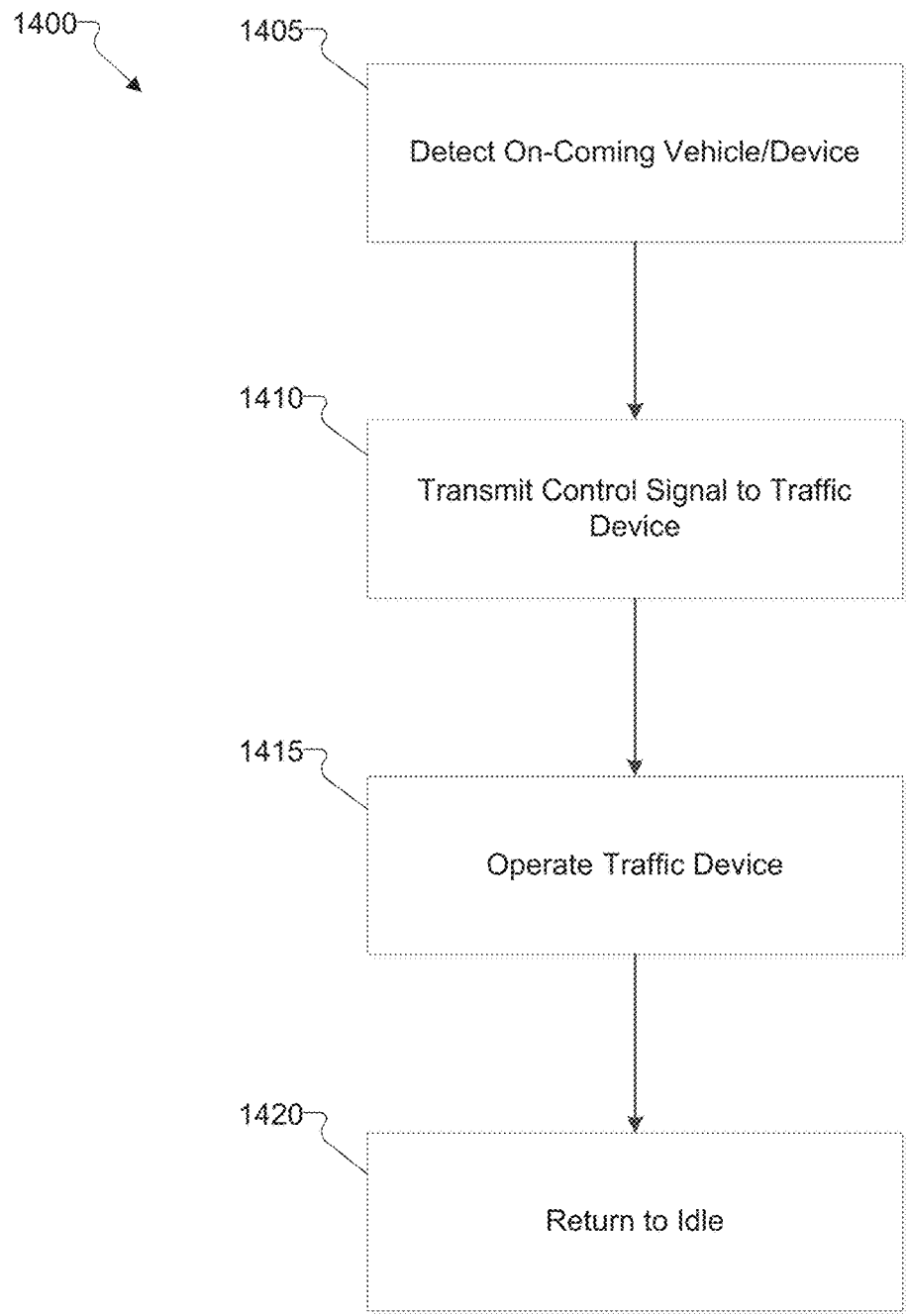
FIG. 14 illustrates a process for controlling traffic signals and safety devices according to embodiments of the present disclosure.

FIG. 14 illustrates a process for controlling traffic signals and safety devices according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a data expansion roadway device.

In certain embodiments, a data expansion device (DED) is configured to communicate with or control traffic control or safety devices, or both. The traffic control or safety devices can include street lights, pedestrian lights, parking lot lights, traffic signals, traffic control gates, and the like. The traffic control or safety devices can be in a sleep or idle state and activate in response to an approaching vehicle or pedestrian. For example, a street light can be in an idle state, such as in a low energy state or off even though it is during a night time hour and ambient light levels would dictate that the streetlight should be on. As a vehicle or pedestrian approaches, the streetlight receives a signal from the DED that causes the streetlight to transition to an active state and activate in sufficient time to properly illuminate a respective area or section of the road. After the vehicle or pedestrian passes through the area or section of road, the streetlight receives another signal from the DED to return to the idle state.

In block 1405, a data expansion device (DED), such as DER 100, detects an on-coming vehicle. The DED can be configured as any one of the DER's 100 shown in FIGS. 1A, 1B, 2A, 2B, 2C, 3A, 3B and 3C and include control system 400 shown in FIG. 4, or DER system 900 shown in FIG. 9. The DED is coupled to one or more traffic control or safety devices, or signage, or a combination of these in the area. For example, the DED can be coupled to a traffic signal at a proximate intersection, coupled to one or more street lights or traffic signs that are designed to illuminate a section of road that includes or is proximate to the DED, or coupled to one or more billboards or pedestrian lights that are designed to illuminate a section of walkway that includes or is proximate to the DED. The traffic control or safety devices, or signage may be in a sleep state such that, even though the ambient light is low enough to require artificial illumination, such as during night time hours, the traffic control or safety devices, or signage are in an off-state or other low-voltage consumption state in which minimal illumination is generated or minimal power consumed for operation. As an example, a traffic signal may be in an idle state in which the signals in one direction are flashing yellow and the signals in another direction are flashing red, or the traffic signal may be configured to have the lights in one direction off or set to green and the lights in another direction set to red, or any other suitable variation as determined by transportation officials. The DED can be a single DER 100 or be a part of a system of DERs 100, such as shown in FIGS. 6 and 10. The DER 100 detects an oncoming vehicle or pedestrian. The DED can detect the on-coming vehicle or pedestrian via a communication signal with a mobile device included in the vehicle or carried by the pedestrian. In certain embodiments, the mobile device is in previous communication with the DED or a system of DERs 100 that include the DED. In certain embodiments, the mobile device has been handed over from another DER 100 or system of DERs 100. The DED also can detect the on-coming vehicle or pedestrian via the RADAR unit 415 or camera 425.

In block 1410, the DED transmits a control signal to the traffic controls or safety devices, or signage, or a combination of these in the area. The control signal can be a signal indicting that the recipient devices needs to activate or transition to an active mode or and be a signal directing the recipient device how to operate. For example, when the DED detects an oncoming emergency response vehicle, the DED can transmit the control signal to a traffic signal to indicate to it that the light facing the oncoming emergency response vehicle should be green and the others red. As another example, the control signal can cause the street lights to illuminate in a section of roadway on which the vehicle is about to traverse. In certain embodiments, the DED activates the traffic controls or safety devices, or signage, or a combination of these in the area in stages. The DED computes the vehicle speed and determines a number of traffic signals and street lights to activate based on the expected arrival time of the vehicle in a certain area. As such, the DED can minimize energy consumption until such energy is required to illuminate the specified roadway. In certain embodiments, when the DED detects that a pedestrian is approaching, the DED activates pedestrian lights and crosswalk signals, while appropriately controlling the traffic signals, to enable the pedestrian to safely traverse the walkway. In certain such embodiments, the street lights may not be activated. Alternatively, when detecting a vehicle and no pedestrian, the DED can transmit one or more control signals that cause the traffic control devices and street lights to activate while leaving the pedestrian lights dormant. In certain embodiments, when the DED detects a subscribed member, such as by identifying an identifier in the mobile device or in response to a communication between the mobile device and the DED, the DED transmits the control signal corresponding to a user profile. For example, based on a known address of in the user profile, the DED can compute a most probable route for the vehicle or pedestrian and communicate with various traffic control devices, lights, signage and other DERs 100 to coordinate illumination along the path. In certain embodiments, based on a most probable path, or in response to communication from the mobile device coupled to a navigation system having a planned route, the DED communicates with one or more other DERs 100, such as other DER chains, to determine traffic congestion and uncongested alternative routes. In certain such embodiments, the route calculations are performed in a central server or in an access point, such as node 407.

In block 1415, the respective traffic controls, safety devices, or signage in the area operate in response to the control signal. Based on the control signal, the traffic controls, safety devices, or signage transition to an active state or operational mode. The devices can illuminate such that one or more devices are active while others are inactive. The devices can illuminate for a specified period of time or until a second control signal is received instructing deactivation of the device. In certain embodiment, in response to the control signal, one or more billboards operate and display specified advertisements or messages, such as public service announcements.

In block 1420, the respective traffic controls, safety devices, or signage in the area are returned to an idle, off or low energy consumption state. In certain embodiments, the respective traffic controls, safety devices, or signage in the area remain on for a specified period of time. In certain embodiments, the DED calculates a time period for the respective traffic controls, safety devices, or signage in the area to remain in the active states and communicates such time period as part of the control signal. In certain embodiments, after the time period has elapsed, the DED transmits a second control signal to the respective traffic controls, safety devices, or signage in the area causing the respective traffic controls, safety devices, or signage in the area to transition to the idle, off or low energy consumption state. In certain embodiments, the DED detects that the vehicle or pedestrian has left the area and transmits the second control signal causing the respective traffic controls, safety devices, or signage in the area to transition to the idle, off or low energy consumption state. In certain embodiments, when a second or subsequent DED detects the same vehicle or pedestrian, such as via an identification of an identifier in the mobile device, the DED transmits the second control signal to the respective traffic controls, safety devices, or signage in the area causing the respective traffic controls, safety devices, or signage in the area to transition to the idle, off or low energy consumption state.

Although various features have been shown in the figures and described above, various changes may be made to the figures. For example, the size, shape, arrangement, and layout of components shown in FIGS. 1 through 6 and 8 are for illustration only. Each component could have any suitable size, shape, and dimensions, and multiple components could have any suitable arrangement and layout. Also, various components in FIGS. 1 through 6 could be combined, further subdivided, or omitted and additional components could be added according to particular needs. For instance, a system using GTDs could support only cellular or satellite communications. Further, each component in a device or system could be implemented using any suitable structure(s) for performing the described function(s). In addition, while FIGS. 7, 11, 12, 13 and 14 illustrate various series of steps, various steps in FIGS. 7, 11, 12, 13 and 14 could overlap, occur in parallel, occur multiple times, or occur in a different order.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:
1. A system comprising:
a first roadway communication device configured to establish a first channel with a first electronic device in a first vehicle and to receive data from the first electronic device in the first vehicle;
a second roadway communication device communicatively coupled to the first roadway device and configured to establish a second channel with a second electronic device in a second vehicle and to communicate the data to the second electronic device in the second vehicle;

wherein each of the roadway communication devices comprises:
- a wireless transceiver configured to transmit and receive the data;
- a communication interface configured to establish communication links to and from at least one other roadway communication device;
- processing circuitry configured to relay the data between one or more of: other roadway communication devices or electronic devices in respective vehicles; and
- a housing configured to contain the processing circuitry, communication interface and the wireless transceiver, wherein the housing is configured to be mounted within a roadway surface.

2. The system of claim 1, wherein the transceiver is configured to communicate with the second electronic device via a WIFI connection.

3. The system of claim 1, wherein the housing is configured to be mounted on a roadway surface.

4. The system of claim 1, wherein a connection between communication interfaces of the roadway communication devices forms a daisy chain.

5. The system of claim 4, wherein the daisy chain is a logical daisy chain.

6. The system of claim 1, wherein the first roadway communication device is included in a first set of roadway communication devices coupled to a first network node and the second roadway communication device is included in a second set of roadway communication devices coupled to a second network node.

7. The system of claim 6, wherein the first network node and the second network node are coupled via at least one of: a network connect or a direct connection.

8. A method comprising
- establishing, by a first roadway communication device, a first channel with a first electronic device in a first vehicle;
- receiving, by the first roadway communication device, data from the first electronic device in the first vehicle;
- relaying, by the first roadway communication device, the data to a second roadway communication device; and
- establishing, by the second roadway communication device, a second channel with a second electronic device in a second vehicle;
- communicating, by the second roadway communication device, the data to a second electronic device in a second vehicle, wherein each of the roadway communication devices comprises a housing configured to be mounted on or within a roadway surface.

9. The method of claim 8, wherein receiving comprises receiving the data from the second electronic device via a WIFI connection.

10. The method of claim 8, wherein the housing is configured to be mounted on a roadway surface.

11. The method of claim 8, wherein a connection between roadway communication devices forms a daisy chain.

12. The method of claim 11, wherein the daisy chain is a logical daisy chain.

13. The method of claim 8, wherein the first roadway communication device is included in a first set of roadway communication devices coupled to a first network node and the second roadway communication device is included in a second set of roadway communication devices coupled to a second network node.

14. The method of claim 13, wherein the first network node and the second network node are coupled via at least one of: a network connect or a direct connection.

15. A roadway device comprising:
- a transceiver configured to establish a channel with a first electronic device in a first vehicle and to transmit and receive data from the first electronic device in the first vehicle;
- a communication interface configured to communicatively couple to at least one other roadway communication device;
- processing circuitry configured to relay the data between the electronic device and the at least one other roadway communication device; and
- a housing configured to contain the processing circuitry, communication interface and the wireless transceiver.

16. The roadway device of claim 15, wherein the transceiver is configured to communicate with the first electronic device via a WIFI connection.

17. The roadway device of claim 15, wherein the housing is configured to be mounted on a roadway surface.

18. The roadway device of claim 15, wherein a connection between the communication interface and a communication interface of the at least one other roadway communication device forms a daisy chain.

19. The roadway device of claim 18, wherein the daisy chain is a logical daisy chain.

20. The roadway device of claim 15, wherein the communication interface is configured to communicate with one or more other roadway communication devices in a first set of roadway communication devices coupled to a first network node and one or more other roadway communication devices in a second set of roadway communication devices coupled to a second network node, the first set of roadway communication devices including the roadway device.

* * * * *